United States Patent
Ishii et al.

(10) Patent No.: US 11,489,432 B2
(45) Date of Patent: Nov. 1, 2022

(54) SELF-POWER FEED CIRCUIT AND POWER CONVERSION DEVICE

(71) Applicants: Mitsubishi Electric Corporation, Tokyo (JP); Toshiba Mitsubishi-Electric Industrial Systems Corporation, Tokyo (JP)

(72) Inventors: Yuki Ishii, Tokyo (JP); Akito Nakayama, Tokyo (JP); Jumpei Isozaki, Tokyo (JP); Taichiro Tsuchiya, Tokyo (JP)

(73) Assignees: MITSUBISHI ELECTRIC CORPORATION, Tokyo (JP); TOSHIBA MITSUBISEI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 47 days.

(21) Appl. No.: 16/973,431

(22) PCT Filed: Jun. 25, 2018

(86) PCT No.: PCT/JP2018/023993
§ 371 (c)(1),
(2) Date: Dec. 9, 2020

(87) PCT Pub. No.: WO2020/003348
PCT Pub. Date: Jan. 2, 2020

(65) Prior Publication Data
US 2021/0257915 A1 Aug. 19, 2021

(51) Int. Cl.
*H02M 1/32* (2007.01)
*H02M 1/00* (2006.01)
(Continued)

(52) U.S. Cl.
CPC ....... *H02M 1/0006* (2021.05); *H02M 1/0074* (2021.05); *H02M 1/32* (2013.01);
(Continued)

(58) Field of Classification Search
CPC .... H02M 1/0006; H02M 1/32; H02M 1/0074; H02M 1/08; H02M 1/325; H02M 3/1584
See application file for complete search history.

(56) References Cited

U.S. PATENT DOCUMENTS 9,006,930 B2 * 4/2015 Jang .......................... H02J 4/00
307/82
2013/0208519 A1 * 8/2013 Yamamoto ............ H02M 7/217
363/67
(Continued)

FOREIGN PATENT DOCUMENTS

CN 105 991 006 A 10/2016
EP 2549634 A1 1/2013
(Continued)

OTHER PUBLICATIONS

International Search Report and Written Opinion dated Jul. 17, 2018, received for PCT Application No. PCT/JP2018/023993, Filed on Jun. 25, 2018, 10 Pages including English Translation.
(Continued)

*Primary Examiner* — Alex Torres-Rivera
(74) *Attorney, Agent, or Firm* — Xsensus LLP

(57) ABSTRACT

A master converter and a plurality of slave converters each have an input connected to an associated one of a plurality of power storage elements, respectively, and an output connected to an output terminal in parallel. The master converter converts the voltage of the associated capacitor based on a duty ratio for matching an output voltage to a voltage command value, outputs the converted voltage to the output terminal, and transmits a control signal indicative of
(Continued)

the duty ratio to the plurality of slave converters via a signal insulation unit. Each of the plurality of slave converters converts the voltage of the associated capacitor in response to the control signal transmitted via the signal insulation unit and outputs the converted voltage to the output terminal. A correction means is configured to correct at least the duty ratio in the master converter such that the duty ratio in the master converter matches the duty ratio in each of the plurality of slave converters.

17 Claims, 19 Drawing Sheets

(51) Int. Cl.
   *H02M 3/335* (2006.01)
   *H02M 7/48* (2007.01)
(52) U.S. Cl.
   CPC ........ *H02M 1/325* (2021.05); *H02M 3/33523* (2013.01); *H02M 7/48* (2013.01)

(56) References Cited

U.S. PATENT DOCUMENTS

| 2013/0214601 | A1 | 8/2013 | Yang et al. | |
|---|---|---|---|---|
| 2016/0036314 | A1* | 2/2016 | Koyanagi | H02M 1/32 363/65 |
| 2016/0141965 | A1 | 5/2016 | Hasegawa et al. | |
| 2018/0226890 | A1* | 8/2018 | Dai | H02M 3/158 |
| 2020/0161978 | A1* | 5/2020 | Lin | H02M 3/33576 |

FOREIGN PATENT DOCUMENTS

| EP | 2 866 354 A1 | 4/2015 |
|---|---|---|
| JP | 2011-193615 A | 9/2011 |
| JP | 2018-78751 A | 5/2018 |
| WO | 2015/005312 A1 | 1/2015 |

OTHER PUBLICATIONS

Notice of Reasons for Refusal received for Japanese Patent Application No. 2018-562276, dated Feb. 19, 2019, 12 Pages including English Translation.
R. Giri et al: "Common-duty-ratio control of input-series connected modular DC-DC converters with active input voltage and load-current sharing" IEEE Transactions on Industry Applications., vol. 42, No. 4, Jul. 1, 2006, pp. 1101-1111, XP055610033.
European Search Report dated May 21, 2021 in European Application No. 18924674.7.
European Office Action dated Jul. 12, 2022, in European Patent Application No. 18 924 674.7.

\* cited by examiner

SELF-POWER FEED CIRCUIT AND POWER CONVERSION DEVICE

CROSS-REFERENCE TO RELATED APPLICATION

The present application is based on PCT filing PCT/JP2018/023993, filed Jun. 25, 2018, the entire contents of which are incorporated herein by reference.

TECHNICAL FIELD

The present disclosure relates to a self-power feed circuit and a power conversion device.

BACKGROUND ART

For a power conversion device or a semiconductor breaker, there is known a configuration in which a self-power feed circuit is used in order to supply control power supply to a control device such as an internal gate drive circuit and a control circuit. The configuration using the self-power feed circuit directly generates control power supply from a main circuit located inside the power conversion device or the semiconductor breaker, and has an advantage in that dielectric breakdown voltage required for the control power supply can be significantly reduced in applications in which the control power supply needs to be supplied to a high potential portion.

For example, Japanese Patent Laid-Open No. 2011-193615 (PTL 1) discloses, as an example of a self-power feed circuit, a circuit including a plurality of voltage dividing capacitors and a plurality of DC/DC converters having inputs each connected to a voltage dividing capacitor and outputs connected to a control device in parallel. In the self-power feed circuit shown in PTL1, direct-current voltage applied to an input terminal is divided by the plurality of voltage dividing capacitors. Accordingly, control power supply can be generated using a DC/DC converter with an input voltage lower than direct-current voltage of the main circuit without using a current limiting resistor. This can reduce power loss, and a self-power feed circuit having high power conversion efficiency can be implemented.

CITATION LIST

Patent Literature

PTL 1: Japanese Patent Laid-Open No. 2011-193615

SUMMARY OF INVENTION

Technical Problem

In the self-power feed circuit using a voltage dividing capacitor, as described above, when variation occurs in a voltage conversion ratio (a ratio of output voltage to direct-current voltage between terminals of a voltage dividing capacitor) among the plurality of DC/DC converters, variation will be caused among the plurality of voltage dividing capacitors in voltage applied to thereto. The variation in voltage applied to the plurality of voltage dividing capacitors may result in any of the plurality of voltage dividing capacitors suffering overvoltage and being destroyed.

As a solution to this, in PTL 1, voltage adjustable circuits are connected to voltage dividing capacitors in parallel. The voltage adjustable circuit has a function to stop an output when the DC/DC converter has an input voltage equal to or lower than a predetermined value. However, it is necessary to connect a voltage adjustable circuit to each voltage dividing capacitor, and the self-power feed circuit may be increased in size.

The present invention has been made in order to solve the above-described problem, and an object of the present invention is to provide a self-power feed circuit capable of suppressing variation in voltage of a plurality of voltage dividing capacitors in a miniaturized configuration, and a power conversion device including the self-power feed circuit.

Solution to Problem

A self-power feed circuit according to the present disclosure is configured to feed power from a main circuit to a control device of the main circuit. The self-power feed circuit comprises: first and second input terminals electrically connected to the main circuit; an output terminal electrically connected to the control device; a plurality of power storage elements connected in series between the first and second input terminals; a plurality of voltage converters each having an input connected to an associated one of the plurality of power storage elements, and an output connected to the output terminal in parallel; and a signal insulation unit to transmit a signal in a state with the plurality of voltage converters electrically insulated from one another. The plurality of voltage converters include a master converter and a plurality of slave converters. The master converter converts a voltage of an associated power storage element, based on a duty ratio for matching an output voltage to a voltage command value, outputs the converted voltage to the output terminal, and transmits a control signal indicative of the duty ratio to the plurality of slave converters via a signal insulation unit. The plurality of slave converters each convert a voltage of an associated power storage element in response to the control signal transmitted via the signal insulation unit, and output the converted voltage to the output terminal. The self-power feed circuit further comprises a correction means to correct at least the duty ratio in the master converter such that the duty ratio in the master converter matches a duty ratio in each of the plurality of slave converters.

Advantageous Effects of Invention

According to the present disclosure, there can be provided a self-power feed circuit capable of suppressing variation in voltage of a plurality of voltage dividing capacitors in a miniaturized configuration, and a power conversion device including the self-power feed circuit.

DESCRIPTION OF EMBODIMENTS

Hereinafter, embodiments of the present invention will specifically be described with reference to the drawings. Note that identical or corresponding components in the figures are identically denoted and will not be described redundantly in principle.

First Embodiment

Figure 1:
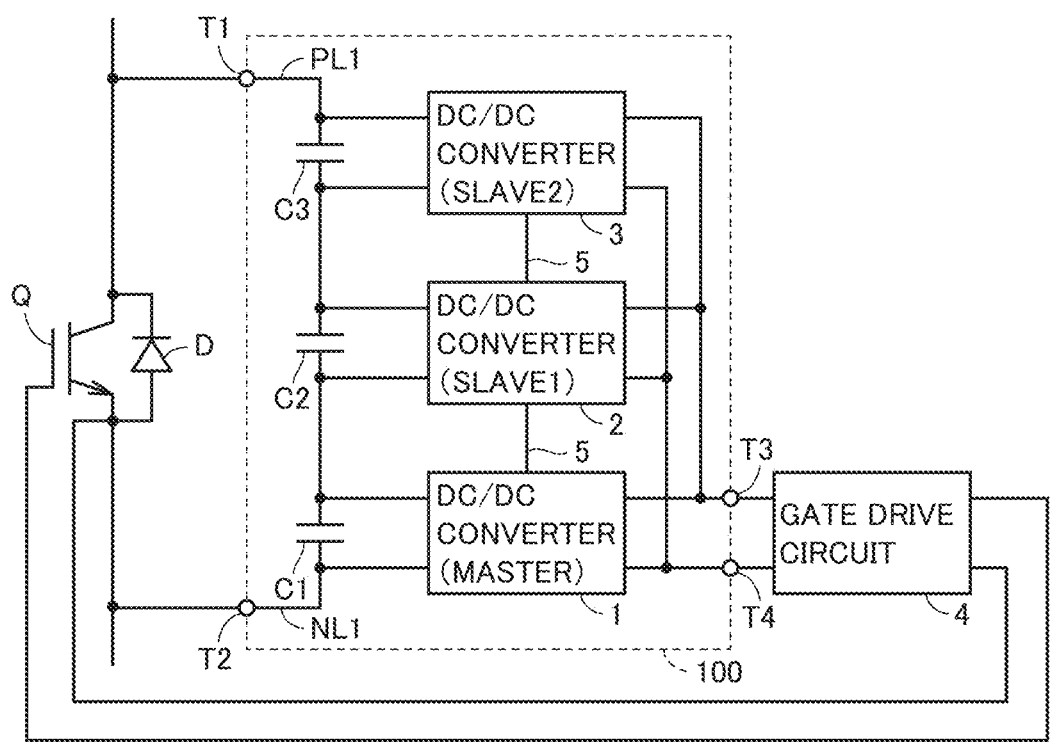
FIG. 1 is a schematic block diagram for illustrating an exemplary configuration of a self-power feed circuit according to a first embodiment.

FIG. 1 is a schematic block diagram for illustrating an exemplary configuration of a self-power feed circuit according to a first embodiment of the present invention. A self-power feed circuit 100 according to the first embodiment is configured to supply power from a main circuit to a control device of the main circuit. The main circuit includes a switching element. The control device of the main circuit includes a gate drive circuit for the switching element, a control circuit, and other circuits.

In the example of FIG. 1, self-power feed circuit 100 is configured to utilize voltage applied to a switching element Q, which constitutes a power conversion device such as an inverter, to supply power to gate drive circuit 4 for switching element Q. Switching element Q can be configured by connecting an FWD (Freewheeling Diode) to any self-arc-extinguishing semiconductor switching element such as an IGBT (Insulated Gate Bipolar transistor), a MOSFET (Metal-Oxide-Semiconductor Filed Effect Transistor) and a GCT (Gate Commutated Turn-off) thyristor in antiparallel. The semiconductor switching element is not limited to an element made of Si, and an element made of a wide bandgap semiconductor such as SiC or GaN (SiC-MOSFET and GaN-HEMT (High Electron Mobility Transistor)) may be used. The FWD may be a parasitic diode of a semiconductor switching element.

Referring to FIG. 1, self-power feed circuit 100 includes input terminals T1 and T2, output terminals T3 and T4, a plurality of capacitors C1 to C3, and a plurality of DC/DC converters 1 to 3.

Input terminals T1 and T2 are electrically connected to switching element Q. Output terminals T3 and T4 are electrically connected to gate drive circuit 4. Input terminal T1 corresponds to a "first input terminal," input terminal T2 corresponds to a "second input terminal," and output terminals T3 and T4 correspond to an "output terminal."

The plurality of capacitors C1 to C3 are connected in series between input terminals T1 and T2. While switching element Q is in an OFF period, capacitors C1 to C3 are charged and divided in voltage by a ratio in capacitance of the capacitors. Capacitors C1 to C3 constitute a voltage dividing capacitor. Capacitors C1 to C3 can be various types of capacitors such as an electrolytic capacitor, a film capacitor, a ceramic capacitor, and an electric double layer capacitor. Alternatively, a series circuit of a plurality of secondary batteries may be used instead of the series circuit of capacitors C1 to C3. Capacitors C1 to C3 correspond to an embodiment of a "power storage element."

The plurality of DC/DC converters 1 to 3 have their respective inputs connected to the plurality of capacitors C1 to C3, respectively, and their respective outputs connected to output terminals T3 and T4 in parallel. Voltage applied to each of capacitors C1 to C3 is converted by an associated DC/DC converter to a voltage necessary for driving the gate of switching element Q. The voltage generated by each DC/DC converter is supplied to gate drive circuit 4 via output terminals T3 and T4. Thereby, the gate of switching element Q is driven. DC/DC converters 1 to 3 correspond to an embodiment of a "voltage converter."

An insulated DC/DC converter can be applied to DC/DC converters 1 to 3. For the insulated DC/DC converter, a known system can be used, such as a flyback converter, a forward converter, a push-pull converter, a half bridge converter, and a full bridge converter.

While in the example of FIG. 1 three DC/DC converters are provided so as to correspond to three capacitors, respectively, the number of capacitors and that of DC/DC converters are not limited thereto insofar as the capacitors and the DC/DC converters are provided such that each capacitor is associated with a DC/DC converter.

DC/DC converters 1 to 3 include one master converter 1 and two slave converters 2 and 3. Master converter 1 and slave converters 2 and 3 are communicatively connected by a signal line 5. A signal can be transmitted between master converter 1 and slave converters 2 and 3 in an electrically insulated state by a signal insulation unit described hereinafter. Master converter 1 corresponds to an embodiment of a "master converter," and slave converters 2 and 3 correspond to an embodiment of a "slave converter."

In the first embodiment, master converter 1 and slave converters 2 and 3 have their respective control units tree-connected with master converter 1 being of a highest level. In FIG. 1, master converter 1 is set to the highest level and slave converter 3 is set to the lowest level, and master converter 1 and slave converters 2 and 3 are connected such that master converter 1 initially transmits a signal to slave converter 2 and slave converter 2 subsequently transmits the signal to slave converter 3. It should be noted, however, that the signal insulation unit ensures electrical insulation among master converter 1 and slave converters 2 and 3.

Figure 2:
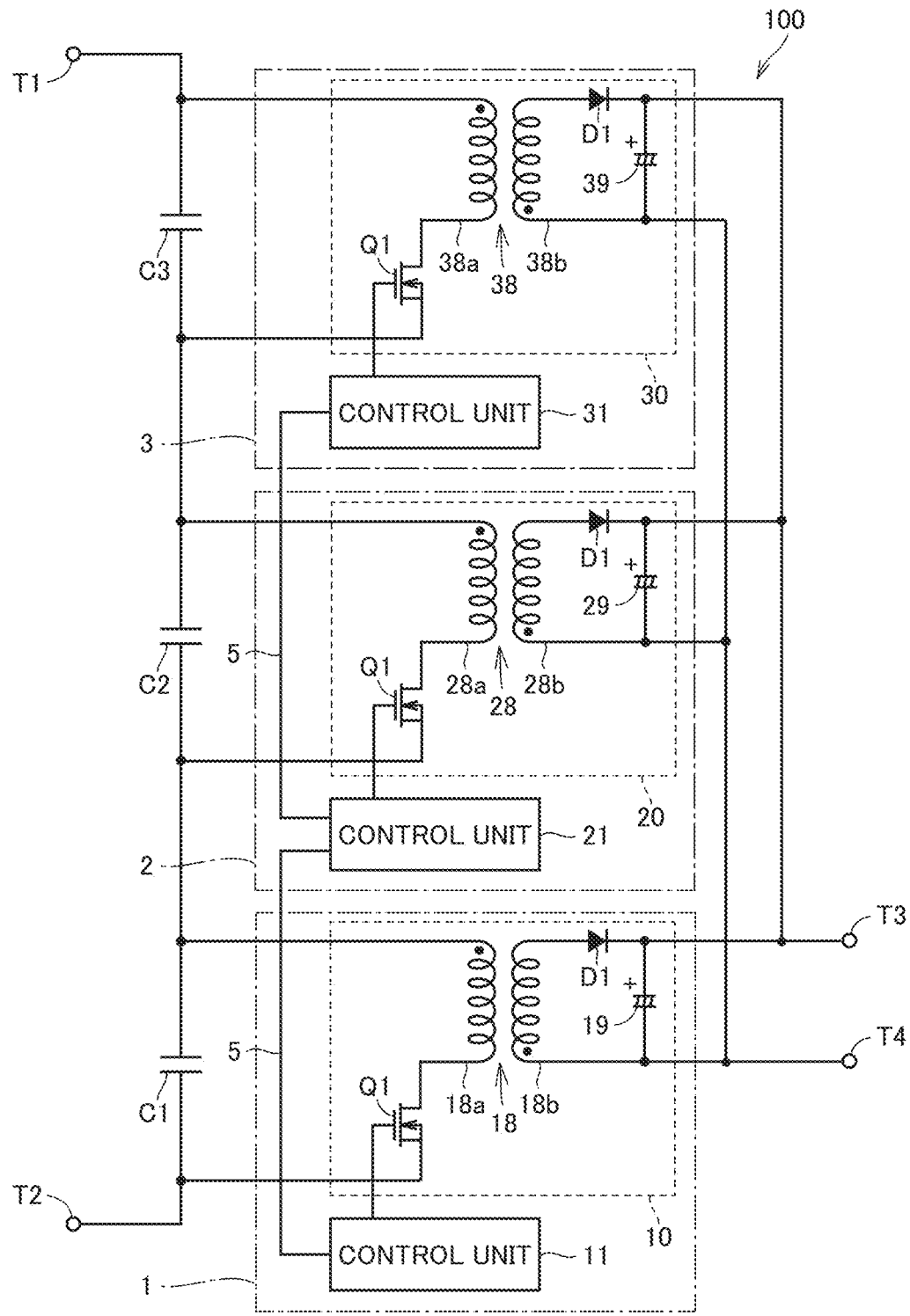
FIG. 2 is a circuit diagram showing an exemplary configuration of a DC/DC converter shown in FIG. 1.

Reference will now be made to FIG. 2 to describe an exemplary configuration of DC/DC converters 1 to 3 shown in FIG. 1.

Referring to FIG. 2, master converter 1 includes a voltage conversion unit 10 and a control unit 11. Voltage conversion unit 10 is connected between capacitor C1 and output terminals T3 and T4, and converts direct-current voltage between the terminals of capacitor C1 (hereinafter also simply referred to as "capacitor voltage E1") to a voltage required to drive the gate of switching element Q. Voltage conversion unit 10 can transmit to gate drive circuit 4 direct-current power supplied from capacitor C1.

Voltage conversion unit 10 is, for example, an insulated flyback converter. Other types of DC/DC converters may be used instead of the flyback converter. In the example of FIG. 2, voltage conversion unit 10 includes a transformer 18, a switching element Q1, a diode D1, and a capacitor 19.

Transformer 18 has a primary winding 18a and a secondary winding 18b. Primary winding 18a and secondary winding 18b are insulated. Switching element Q1 is connected to primary winding 18a in series. A series circuit of primary winding 18a and switching element Q1 is connected to capacitor C1 in parallel. Switching element Q1 can be composed of any self-arc-extinguishing switching element. Switching element Q1 is switched on and off by a gate signal provided from control unit 11. The gate signal corresponds to a "control signal." While switching element Q1 is in an ON period, capacitor voltage E1 is applied to primary winding 18a. Transformer 18 transmits the power that is supplied to primary winding 18a to secondary winding 18b.

Secondary winding 18b has one end connected to an anode of diode D1, and the other end connected to output terminal T4. Diode D1 has a cathode connected to output terminal T3. Capacitor 19 is connected between output terminal T3 and output terminal T4. Diode D1 and capacitor 19 rectify energy emitted from secondary winding 18b while switching element Q1 is in an OFF period, and make the energy into direct current. Thus, voltage conversion unit 10 generates output voltage as direct current between output terminal T3 and output terminal T4.

In voltage conversion unit 10, when transformer 18 has primary winding 18a with a number n1 of turns and secondary winding 18b with a number n2 of turns, then, between capacitor voltage E1 (hereinafter also referred to as an input voltage) and an output voltage Vo is established the following expression (1):

$$E1 \cdot Ton = n1/n2 \cdot Vo \cdot (T-Ton) \qquad (1),$$

where T represents the switching period of switching element Q1 and Ton represents the switching element's ON time.

Herein, when a ratio of ON time Ton of switching element Q1 to switching period T (i.e., Ton/T) is defined as a "duty ratio DR," the following expression (2) is established:

$$Vo = n2/n1 \cdot DR/(1-DR) \cdot E1 \qquad (2).$$

As can be seen from expression (2), a voltage conversion ratio Vo/E1 in voltage conversion unit 10 can be controlled by changing duty ratio DR of switching element Q1. In other words, output voltage Vo can be controlled by variably controlling the voltage conversion ratio by increasing or decreasing duty ratio DR.

Control unit 11 controls duty ratio DR based on a command received from a host controller (not shown) to generate a gate signal, which is a control signal for controlling switching element Q1 to be turned on/off. Control unit 11 is configured for example by a microcomputer. As an example, control unit 11 incorporates a memory and a central processing unit (CPU) (not shown), and can perform a control operation, which will be described hereinafter, by software-processing by the CPU executing a program previously stored in the memory. Alternatively, the control operation can partially or entirely be implemented by hardware-processing using incorporated, dedicated electronic circuitry or the like instead of the software-processing.

Slave converter 2 includes a voltage conversion unit 20 and a control unit 21. Voltage conversion unit 20 is identical in configuration to voltage conversion unit 10. Voltage conversion unit 20 is connected between capacitor C2 and output terminals T3 and T4, and converts direct-current voltage between the terminals of capacitor C2 (hereinafter also simply referred to as "capacitor voltage E2") to a voltage required to drive the gate of switching element Q. Voltage conversion unit 20 can transmit to gate drive circuit 4 direct-current power supplied from capacitor C2.

Slave converter 3 includes a voltage conversion unit 30 and a control unit 31. Voltage conversion unit 30 is identical in configuration to voltage conversion unit 10. Voltage conversion unit 30 is connected between capacitor C3 and output terminals T3 and T4, and converts direct-current voltage between the terminals of capacitor C3 (hereinafter also simply referred to as "capacitor voltage E3") to a voltage required to drive the gate of switching element Q. Voltage conversion unit 30 can transmit to gate drive circuit 4 direct-current power supplied from capacitor C3.

Control unit 11 of master converter 1, control unit 21 of slave converter 2, and control unit 31 of slave converter 3 are tree-connected by signal line 5. Control unit 11 can transmit a signal to control unit 21 via signal line 5. Control unit 21 can transmit a signal to control unit 31 via signal line 5. As will be described hereinafter, a signal insulation unit is connected to signal line 5 connecting the control units. Thus, a signal can be transmitted among control units 11, 21 and 31 in an electrically insulated state via the signal insulation unit.

Specifically, control unit 11 uses the generated gate signal to drive voltage conversion unit 10, and also transmits the gate signal to control unit 21 via signal line 5. Control unit 21 receives the gate signal transmitted via signal line 5 and uses the gate signal to drive voltage conversion unit 20, and also further transmits the gate signal to control unit 31 via signal line 5. Control unit 31 receives the gate signal transmitted via signal line 5 and uses the gate signal to drive voltage conversion unit 30. Thus, master converter 1 and slave converters 2 and 3 will have their respective voltage conversion units 10, 20, and 30 driven by a gate signal which is common among the voltage conversion units. Accordingly, duty ratios DR of the switching elements among voltage conversion units 10, 20, and 30 are equal to one another.

Tree-connecting control units 11, 21 and 31 can reduce dielectric breakdown voltage required for signal line 5. In the first embodiment, master converter 1 and slave converters 2 and 3 are connected in series, and accordingly, signal lines 5 connected to the converters are different in potential from one another. In the example of FIG. 1, signal line 5 connected to master converter 1 is lowest in potential, and signal line 5 connected to slave converter 3 is highest in potential. In the tree type connection, however, immediately adjacent converters are connected by signal line 5, and a difference in potential for a single DC/DC converter suffices for dielectric breakdown voltage required for signal line 5. Signal line 5 can thus be miniaturized.

In a star type connection described hereinafter, master converter 1 and each of slave converters 2 and 3 are directly connected by signal line 5. Therefore, dielectric breakdown voltage required for signal line 5 connecting master converter 1 and slave converter 3 will be larger than dielectric breakdown voltage required for signal line 5 connecting master converter 1 and slave converter 2. According to this, as the number of DC/DC converters connected in series increases, dielectric breakdown voltage required for signal line 5 will increase, and signal line 5 may be increased in size.

Hereinafter a configuration of control units 11, 21 and 31 will be described with reference to FIG. 3. Each block shown in FIG. 3 has a function which can be implemented by at least one of software processing by the control unit and hardware processing.

Figure 3:
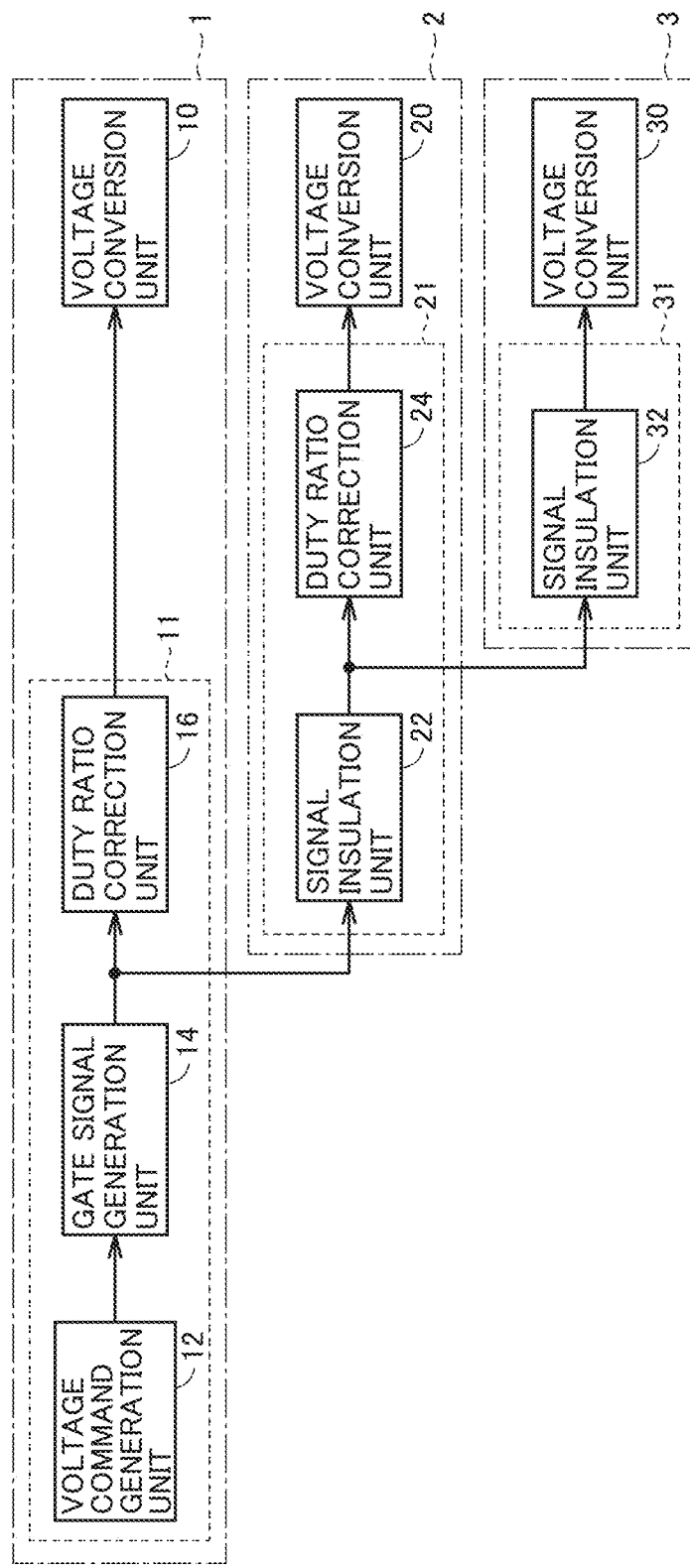
FIG. 3 is a block diagram for illustrating a configuration of a control unit in the self-power feed circuit according to the first embodiment.

Referring to FIG. 3, control unit 11 of master converter 1 includes a voltage command generation unit 12, a gate signal generation unit 14, and a duty ratio correction unit 16. Voltage command generation unit 12 generates a voltage command, which indicates a target voltage for output voltage Vo of self-power feed circuit 100. The target voltage corresponds to a power supply voltage to be supplied to gate drive circuit 4. Voltage command generation unit 12 can generate the voltage command by feedback control for compensating for a deviation between output voltage Vo of self-power feed circuit 100 detected by a voltage detector (not shown) from the target voltage, for example. The generated voltage command is provided to gate signal generation unit 14.

Gate signal generation unit 14 generates a gate signal based on the voltage command generated by voltage command generation unit 12. The generated gate signal will serve as a gate signal common among voltage conversion units 10, 20, and 30. A known technique such as a PWM (Pulse Width Modulation) control system can be used to generate the gate signal. For example, gate signal generation unit 14 generates the gate signal based on comparing the voltage command with a carrier wave. The carrier wave is for example a sawtooth wave having a frequency corresponding to the reciprocal of switching period T (or a switching frequency). The gate signal is a PWM signal and is a rectangular wave signal of the switching frequency. The PWM signal has a pulse width varying with duty ratio DR.

Gate signal generation unit 14 outputs the generated gate signal to duty ratio correction unit 16 and also transmits the generated gate signal to control unit 21 of slave converter 2 via signal line 5. Duty ratio correction unit 16 will be described hereinafter.

In slave converter 2, control unit 21 includes a signal insulation unit 22 and a duty ratio correction unit 24. Signal insulation unit 22 is provided at signal line 5 connecting control unit 11 and control unit 21, and is configured to transmit a signal while ensuring electrical insulation between control unit 11 and control unit 21.

Signal insulation unit 22 is for example a photocoupler. Note that, instead of the photocoupler, signal insulation unit 22 can be implemented by a digital isolator which transmits a signal through an alternating-current coupling element, an optical transmission circuit including an optical transmitting/receiving element and an optical fiber, or the like. The digital isolator includes a magnetic coupler or a capacitive coupler.

When signal insulation unit 22 receives the gate signal from gate signal generation unit 14 of control unit 11, signal insulation unit 22 outputs the gate signal to duty ratio correction unit 24, and also transmits the gate signal to control unit 31 of slave converter 3 via signal line 5. Duty ratio correction unit 24 will be described hereinafter.

In slave converter 3, control unit 31 includes a signal insulation unit 32. Signal insulation unit 32 is provided at signal line 5 connecting control unit 21 and control unit 31, and is configured to transmit a signal while ensuring electrical insulation between control unit 21 and control unit 31. Signal insulation unit 32 can be similar in configuration to signal insulation unit 22 described above.

When signal insulation unit 32 receives the gate signal from signal insulation unit 22 of control unit 21, signal insulation unit 32 outputs the gate signal to voltage conversion unit 30. Voltage conversion unit 30 is driven in response to the gate signal. As master converter 1 and slave converters 2 and 3 have their switching elements connected to mutually different potentials, signal insulation units 22 and 32 are provided to electrically insulate the gate signal.

Thus, the gate signal generated by control unit 11 of master converter 1 is transmitted to control unit 21 of slave converter 2 by signal insulation unit 22 and furthermore, transmitted to control unit 31 of slave converter 3 by signal insulation unit 32, and control units 11, 21 and 31 can use the common gate signal to drive voltage conversion units 10, 20 and 30, respectively. That is, duty ratios DR of switching elements Q1 of the flyback converters can be mutually equalized among voltage conversion units 10, 20, and 30.

In the first embodiment, as shown in FIG. 2, voltage conversion units 10, 20, and 30 are connected to output terminals T3 and T4 of self-power feed circuit 100 in parallel, and the voltage conversion units provide mutually equal output voltages Vo. Furthermore, the common gate signal allows voltage conversion units 10, 20, and 30 to have their respective switching elements Q1 switched on/off as controlled by mutually equal duty ratios DR. Thus making output voltages Vo equal to one another and making duty ratios DR equal to one another allow voltage conversion units 10, 20, and 30 to have their input voltages uniformly. Therefore, capacitor voltage E1, capacitor voltage E2, and capacitor voltage E3 can be mutually equalized.

Note, however, that in signal insulation units 22 and 32 for transmitting the gate signal from control unit 11 to control units 21 and 31, delay may occur in rising and falling of an output signal, depending on a response speed of signal insulation units 22 and 32. Accordingly, when a pulsing gate signal is input to each of signal insulation units 22 and 32, the output signal's rising speed and falling speed may be different.

In such a case, a difference may occur between duty ratio DR of the gate signal in master converter 1 and duty ratio DR of the gate signal transmitted to slave converter 2 via signal insulation unit 22. Further, a difference may occur between duty ratio DR of the gate signal in slave converter 2 and duty ratio DR of the gate signal transmitted to slave converter 3 via signal insulation unit 32.

And when the gate signal thus has a duty ratio DR having a difference among master converter 1 and slave converters 2 and 3, voltage conversion units 10, 20, and 30 would each also have a voltage conversion ratio with a difference. As a result, capacitor voltage E1, capacitor voltage E2, and capacitor voltage E3 may vary. As a result, any of capacitors C1 to C3 suffers overvoltage and may be destroyed.

Hereinafter, a difference of duty ratio DR caused by signal insulation units 22 and 32 will be described with reference to a specific example.

Figure 4:
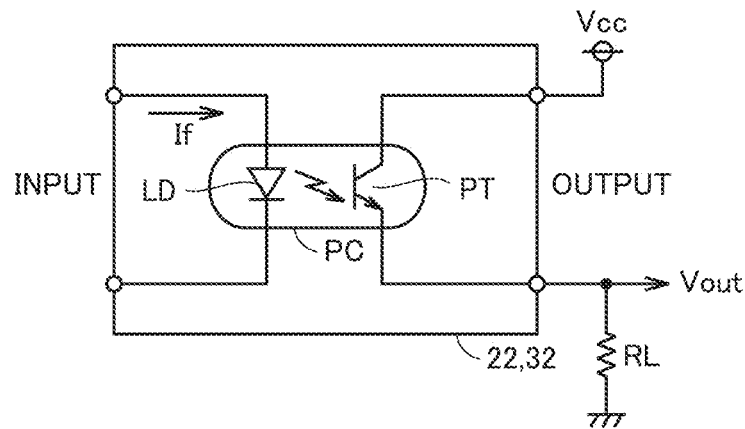
FIG. 4 is a circuit diagram for illustrating an exemplary configuration of a signal insulation unit.

FIG. 4 shows a schematic configuration of a photocoupler PC as a representative example of signal insulation units 22 and 32. As shown in FIG. 4, photocoupler PC includes a light emitting diode LD that emits light when a current passes therethrough, a phototransistor PT through which a current corresponding to an amount of light emitted by light emitting diode LD passes, and a load resistor RL. Phototransistor PT and load resistor RL are connected in series between power supply voltage Vcc and ground voltage GND.

Let us assume that a gate signal generated by control unit 11 of master converter 1 is transmitted to control unit 21 of slave converter 2 via photocoupler PC (or signal insulation unit 22) shown in FIG. 4.

In this case, when the gate signal generated by control unit 11 transitions in voltage level from the L (logic low) level to the H (logic high) level, a current If passes through light emitting diode LD and light emitting diode LD emits light, and phototransistor PT is turned on. When phototransistor PT is turned on, a current passes from power supply voltage Vcc to load resistor RL, and voltage Vout is output from a connection point of phototransistor PT and load resistor RL.

In contrast, when the gate signal transitions in voltage level from the H level to the L level, current If no longer passes through light emitting diode LD, and accordingly, light emitting diode LD is turned off and phototransistor PT is turned off. When phototransistor PT is turned off, there is no current passing through load resistor RL, and output voltage Vout drops to the GND level.

Figure 5:
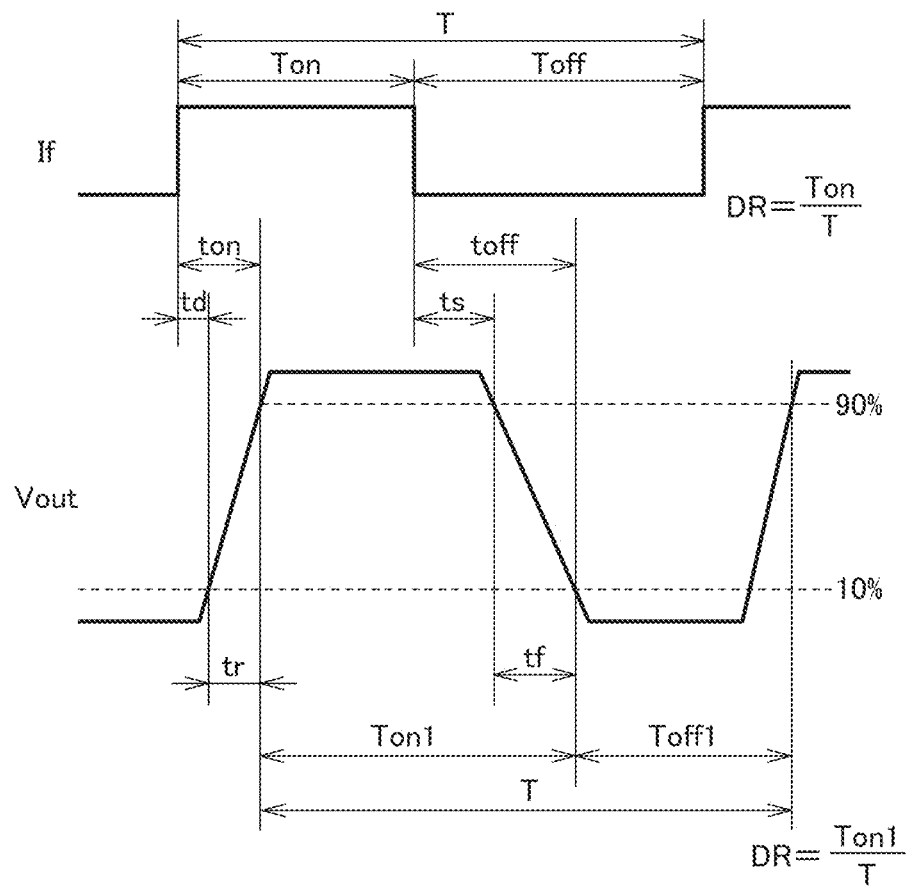
FIG. 5 is a diagram for schematically illustrating a response characteristic of a photocoupler shown in FIG. 4.

FIG. 5 is a diagram for schematically illustrating a response characteristic of photocoupler PC shown in FIG. 4. FIG. 5 represents input current If and output voltage Vout in waveform.

Input current If is a square wave having the same duty ratio DR as the gate signal provided from control unit 11 to photocoupler PC. Accordingly, a time when input current If has the H level corresponds to ON time Ton of switching element Q1, and a time when input current If has the L level corresponds to an OFF time Toff of switching element Q1.

In photocoupler PC, generally, in order to eliminate variation in amplitude of output voltage Vout, phototransistor PT is completely switched and thus used. In this case, load resistor RL's value in resistance is increased, and falling responsivity is decreased as compared with rising responsivity. Accordingly, as shown in FIG. 5, a cumulative falling time ts and a falling time tf is larger than a rising delay time td and a rising time tr. In the example of FIG. 5, delay time td corresponds a period of time from a timing of rising of input current If to a timing of rising of output voltage Vout (a timing of output voltage Vout reaching 10%). Rising time tr corresponds to a period of time from a timing of rising of output voltage Vout until output voltage Vout reaches the H level (or a period of time for which output voltage Vout reaches 90% from 10%). Cumulative time ts corresponds to a period of time from a timing of falling of input current If to a timing of falling of output voltage Vout (a timing of output voltage Vout falling to 90%). Falling time tf corresponds to a period of time from a timing of falling of output voltage Vout until output voltage Vout falls to the L level (a period of time for which output voltage Vout drops to 10% from 90%).

Herein, when a sum of rising delay time td and rising time tr is a turn-on time ton of output voltage Vout and a sum of cumulative falling time ts and falling time tf is a turn-off time toff of output voltage Vout, turn-on time ton and turn-off time toff have a relationship of ton<toff because of td, tr<ts, tf.

In a single switching period T, when a time from a timing of output voltage Vout reaching 90% to a timing of output voltage Vout falling to 10% is represented as Ton1, Ton1 can be expressed as Ton1=Ton−ton+toff using a time Ton for which input current If has the H level. As has been described above, when ton<toff, Ton1>Ton. Therefore, a duty ratio Ton1/T of output voltage Vout is larger than a duty ratio Ton/T of input current If.

According to this, when a pulsed gate signal is transmitted via photocoupler PC of FIG. 4, photocoupler PC tends to output a gate signal having a larger duty ratio DR than that of the signal input to photocoupler PC. Therefore, when photocoupler PC of FIG. 4 is applied to signal insulation units 22 and 32 shown in FIG. 3, duty ratio DR of the gate signal in slave converter 2 (hereinafter DR1) will be larger than duty ratio DR of the gate signal in master converter 1 (i.e., DR1>DR). Furthermore, duty ratio DR of the gate signal in slave converter 3 (hereinafter DR2) will be larger than duty ratio DR1 of the gate signal in slave converter 2 (i.e., DR2>DR1). As a result, it is expected that duty ratio DR of the gate signal in master converter 1, duty ratio DR1 of the gate signal in slave converter 2, and duty ratio DR2 of the gate signal in slave converter 3 have a relationship of DR2>DR1>DR.

As has been described above, when a gate signal has a duty ratio having a relationship of DR2>DR1>DR among master converter 1 and slave converters 2 and 3, then, according to the expression (2), due to equal output voltages Vo, capacitor voltage E1, capacitor voltage E2 and capacitor voltage E3 will have a relationship of E1>E2>E3. According to this, there is a concern that capacitor C1 may suffer overvoltage.

When a gate signal is thus transmitted from master converter 1 to slave converters 2 and 3 via signal insulation units 22 and 32, there is a possibility that each DC/DC converter is controlled by a gate signal having a duty ratio with a difference due to a response speed of signal insulation units 22 and 32. Due to the difference of the duty ratio of the gate signal, there is a concern that any of capacitors C1 to C3 may suffer overvoltage.

Accordingly, self-power feed circuit 100 according to the first embodiment includes a "correction means" configured to correct at least duty ratio DR in master converter 1 so that duty ratio DR in master converter 1 matches duty ratios DR1 and DR2 in slave converters 2 and 3.

In the exemplary configuration of FIGS. 1 and 2, the correction means is configured to correct each of duty ratio DR in master converter 1 and duty ratio DR1 in slave converter 2 to match duty ratio DR2 in slave converter 3. Such a correction means is implemented by duty ratio correction unit 16 for correcting duty ratio DR in master converter 1 and duty ratio correction unit 24 for correcting duty ratio DR1 in slave converter 2.

Specifically, referring to FIG. 3, duty ratio correction unit 16 of master converter 1 is disposed between gate signal generation unit 14 and voltage conversion unit 10, and corrects duty ratio DR of the gate signal generated by gate signal generation unit 14 and provides the corrected gate signal to switching element Q1 of voltage conversion unit 10.

Duty ratio correction unit 24 of slave converter 2 is disposed between signal insulation unit 22 and voltage conversion unit 20, and corrects duty ratio DR1 of the gate signal transmitted by signal insulation unit 22 and provides the corrected gate signal to switching element Q1 of voltage conversion unit 20.

Figure 6:
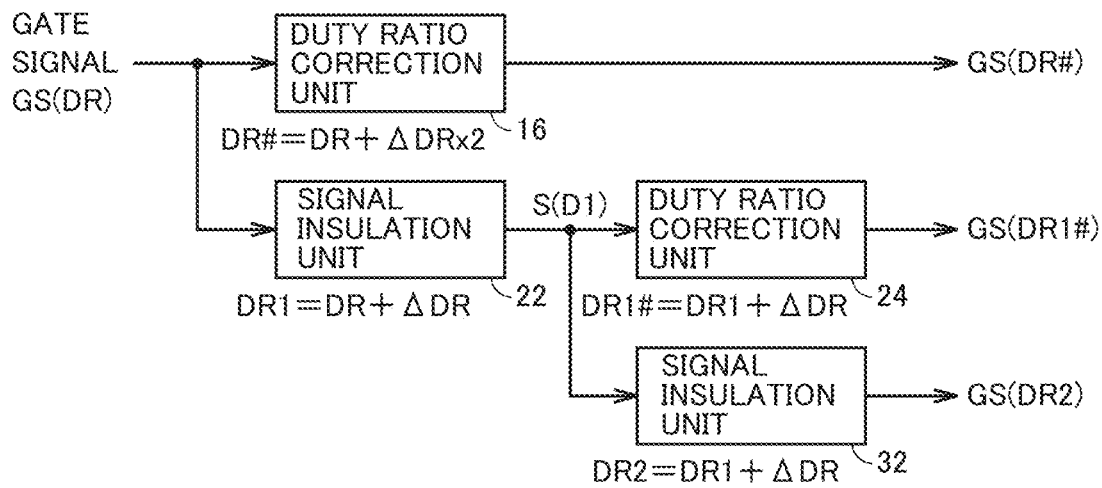
FIG. 6 is a diagram for illustrating a duty ratio correcting process in a duty ratio correction unit.

FIG. 6 is a diagram for illustrating a duty ratio correcting process in duty ratio correction units 16 and 24.

Referring to FIG. 6, duty ratio correction unit 16 and signal insulation unit 22 receive a gate signal GS of duty ratio DR from gate signal generation unit 14. When signal insulation unit 22 receives gate signal GS of duty ratio DR, signal insulation unit 22 transmits gate signal GS to duty ratio correction unit 24 and signal insulation unit 32. It is assumed that duty ratio DR1 of gate signal GS output from signal insulation unit 22 has a difference of ΔDR from duty ratio DR of gate signal GS input to signal insulation unit 22 (i.e., DR1=DR+ΔDR).

When signal insulation unit 32 receives gate signal GS of duty ratio DR1, signal insulation unit 32 outputs gate signal GS to voltage conversion unit 30 (not shown). It is assumed that duty ratio DR2 of gate signal GS output from signal insulation unit 32 has a difference of ΔDR from duty ratio DR1 of gate signal GS input to signal insulation unit 32 (i.e., DR2=DR1+ΔDR). That is, duty ratio DR2 of gate signal GS for driving voltage conversion unit 30 will have a difference of ΔDR×2 from duty ratio DR of gate signal GS generated by gate signal generation unit 14, as signal GS passes through signal insulation units 22 and 32 (i.e., DR2=DR+ΔDR×2).

Accordingly, duty ratio correction unit 16 corrects duty ratio DR of gate signal GS generated by gate signal generation unit 14 so as to match duty ratio DR2. When the corrected duty ratio is represented as DR #, DR # will be duty ratio DR with difference ΔDR×2 added thereto (i.e., DR #=DR+ΔDR×2). Duty ratio correction unit 16 outputs the corrected gate signal GS to voltage conversion unit 10 (not shown).

Duty ratio correction unit 24 corrects duty ratio DR1 of gate signal GS transmitted by signal insulation unit 22 so as to match duty ratio DR2. When the corrected duty ratio is represented as DR1 #, DR1 # will be duty ratio DR1 with difference ΔDR added thereto (i.e., DR1 #=DR1+ΔDR). Since DR1=DR+ΔDR, DR1 # can be represented by DR1 #=DR+ΔDR×2. Duty ratio correction unit 24 outputs the corrected gate signal GS to voltage conversion unit 20 (not shown).

According to this, duty ratio DR # of gate signal GS output to voltage conversion unit 10, duty ratio DR1 # of gate signal GS output to voltage conversion unit 20, and duty ratio DR2 of gate signal GS output to voltage conversion unit 30 will all be DR+ΔDR×2 and thus match one another. Accordingly, voltage conversion units 10, 20, and 30 can have their voltage conversion ratios matched to one another, and variation in voltage applied to capacitors C1 to C3 can be suppressed.

Figure 7:
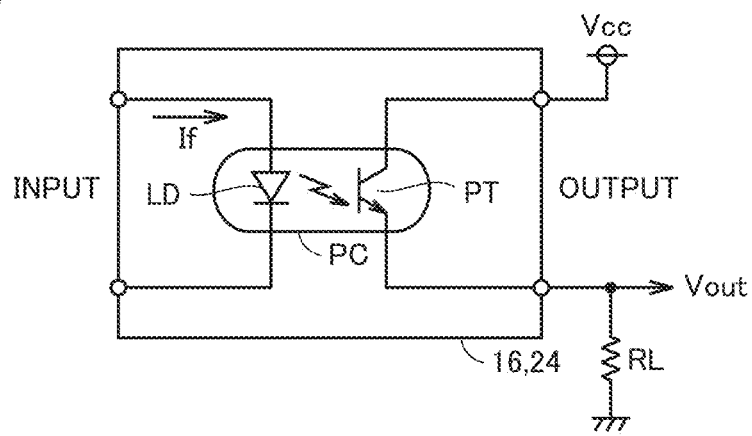
FIG. 7 is a circuit diagram showing a first exemplary configuration of the duty ratio correction unit.
Figure 8:
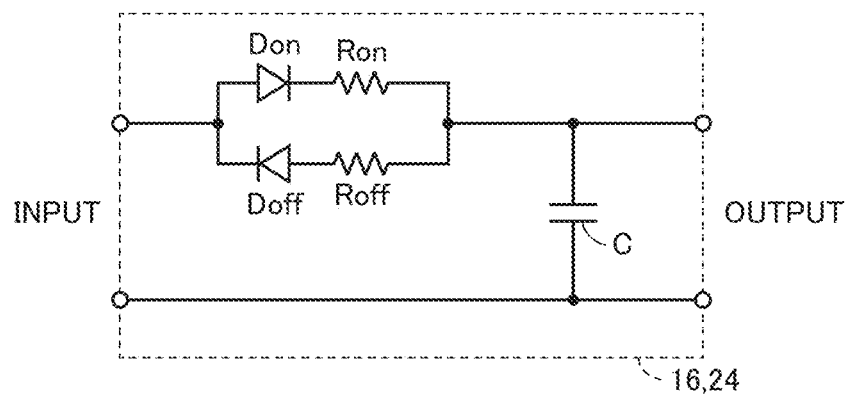
FIG. 8 is a circuit diagram showing a second exemplary configuration of the duty ratio correction unit.

Each of duty ratio correction units 16 and 24 shown in FIG. 6 can be implemented by a photocoupler (see FIG. 7) or a filter circuit (see FIG. 8). Alternatively, duty ratio correction units 16 and 24 may be configured by software on an IC (see FIG. 9).

FIG. 7 shows a schematic configuration of photocoupler PC as a first exemplary configuration of duty ratio correction units 16 and 24. As shown in FIG. 7, photocoupler PC includes light emitting diode LD that emits light when a current passes therethrough, phototransistor PT through which a current corresponding to an amount of light emitted by light emitting diode LD passes, and load resistor RL. Phototransistor PT and load resistor RL are connected in series between power supply voltage Vcc and ground voltage GND.

In duty ratio correction unit 16, load resistor RL of photocoupler PC has a value in resistance adjusted to provide a difference of ΔDR×2 between duty ratio DR of gate signal GS input to light emitting diode LD of photocoupler PC and duty ratio DR # of gate signal GS output from phototransistor PT of photocoupler PC.

In duty ratio correction unit 24, load resistor RL of photocoupler PC has a value in resistance adjusted to provide a difference of ΔDR between duty ratio DR1 of gate signal GS input to light emitting diode LD of photocoupler PC and duty ratio DR1 # of gate signal GS output from phototransistor PT of photocoupler PC.

FIG. 8 shows a schematic configuration of a filter circuit as a second exemplary configuration of duty ratio correction units 16 and 24. As shown in FIG. 8, the filter circuit is composed of an RC low-pass filter and includes resistive elements Ron and Roff, diodes Don and Doff, and a capacitor C. A series circuit of diode Don and resistive element Ron and a series circuit of diode Doff and resistive element Roff are connected in parallel. A current charged to capacitor C passes through the series circuit of diode Don and resistive element Ron. The voltage of capacitor C rises according to a time constant determined by the product of the value in resistance of resistive element Ron and the capacitance of capacitor C. Therefore, by adjusting the value in resistance of resistive element Ron, the filter circuit's output voltage, that is, the gate signal's rising time can be adjusted.

A current discharged from capacitor C passes through the series circuit of diode Doff and resistive element Roff. The voltage of capacitor C falls according to a time constant determined by the product of the value in resistance of resistive element Roff and the capacitance of capacitor C. Therefore, by adjusting the value in resistance of resistive element Roff, the filter circuit's output voltage, that is, the gate signal's falling time can be adjusted.

In duty ratio correction unit 16, resistive elements Ron and Roff have their values in resistance adjusted to provide a difference of ΔDR×2 between duty ratio DR of gate signal GS input to the filter circuit and duty ratio DR # of gate signal GS output from the filter circuit.

In duty ratio correction unit 24, resistive elements Ron and Roff have their values in resistance adjusted to provide a difference of ΔDR between duty ratio DR1 of gate signal GS input to the filter circuit and duty ratio DR1 # of gate signal GS output from the filter circuit.

Figure 9:
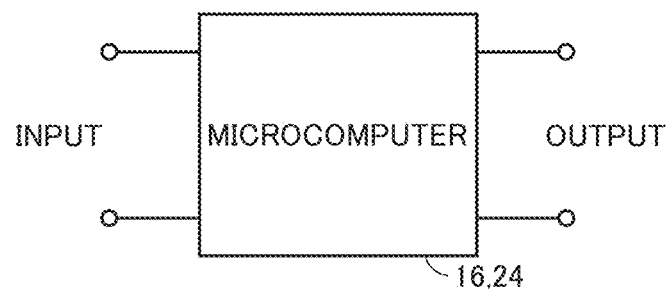
FIG. 9 is a circuit diagram showing a third exemplary configuration of the duty ratio correction unit.

FIG. 9 shows a schematic configuration of a microcomputer as a third exemplary configuration of duty ratio correction units 16 and 24. The microcomputer has a function of adjusting a duty ratio of an input gate signal. Instead of the microcomputer, duty ratio correction units 16 and 24 may be configured by FPGA (Field Programmable Gate Array) or PLD (Programmable Logic Device) or the like.

In duty ratio correction unit 16, the microcomputer is configured to perform software processing for causing a difference of ΔDR×2 between duty ratio DR of gate signal GS input to the microcomputer and duty ratio DR # of gate signal GS output from the microcomputer.

In duty ratio correction unit 24, the microcomputer is configured to perform software processing for causing a difference of ΔDR between duty ratio DR1 of gate signal GS input to the microcomputer and duty ratio DR1 # of gate signal GS output from the microcomputer.

As has been described above, according to the self-power feed circuit according to the first embodiment, in a configuration in which master converter 1 and slave converters 2 and 3 have their control units tree-connected and a gate signal is transmitted from master converter 1 to slave converters 2 and 3 via signal insulation units 22 and 32, a correction means corrects duty ratios of the gate signal in master converter 1 and slave converter 2 so that the duty ratio of the gate signal in master converter 1 and the duty ratios of the gate signal in slave converters 2 and 3 match. This allows master converter 1 and slave converters 2 and 3 to have their voltage conversion ratios matched to one another and can thus suppress variation in voltage of the plurality of voltage dividing capacitors. The voltage dividing capacitor can thus avoid overvoltage.

Further, according to the self-power feed circuit according to the first embodiment, the above-described correction means can be provided in a gate signal system which is a light electrical portion. When this is compared with conventional art of connecting a voltage regulating circuit to each voltage dividing capacitor in parallel, the former allows the self-power feed circuit to be configured to be smaller in size than the latter. As a result, a self-power feed circuit capable of suppressing variation in voltage of a plurality of voltage dividing capacitors while having a miniaturized configuration can be provided.

While in the first embodiment an exemplary configuration in which three DC/DC converters have their control units tree-connected has been described, a configuration in which N DC/DC converters (N≥4) have their control units tree-connected can also have one DC/DC converter thereof to serve as a master converter and generate a gate signal which is in turn transmitted to the remaining (N−1) slave converters via signal line 5 sequentially to enable similar control.

Figure 10:
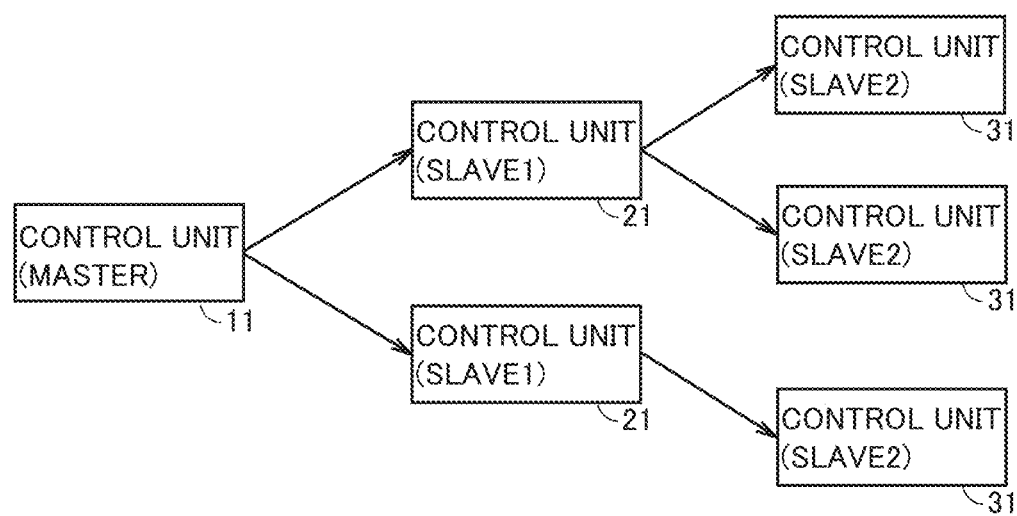
FIG. 10 is a schematic block diagram for illustrating an exemplary configuration of a control unit in the self-power feed circuit according to the first embodiment.

FIG. 10 shows an exemplary configuration in which six DC/DC converters have their control units tree-connected. In the tree type connection, at least one signal insulation unit is interposed between the master converter and a slave converter of a lowest level. Therefore, control unit 11 of the master converter will correct duty ratio DR of the gate signal in the master converter so as to add a sum of difference ΔDR of a duty ratio caused by the at least one signal insulation unit.

In the tree type connection, at least one signal insulation unit is also interposed between a slave converter higher in level than the lowest level and a slave converter of the lowest level. Therefore, the control unit of the slave converter of the higher level will correct duty ratio DR of the gate signal in the slave converter of the higher level so as to add a sum of difference ΔDR of a duty ratio caused by the at least one signal insulation unit. This allows N DC/DC converters to have their voltage ratios matched to one another and can thus suppress variation in voltage of N voltage dividing capacitors.

Second Embodiment

Figure 11:
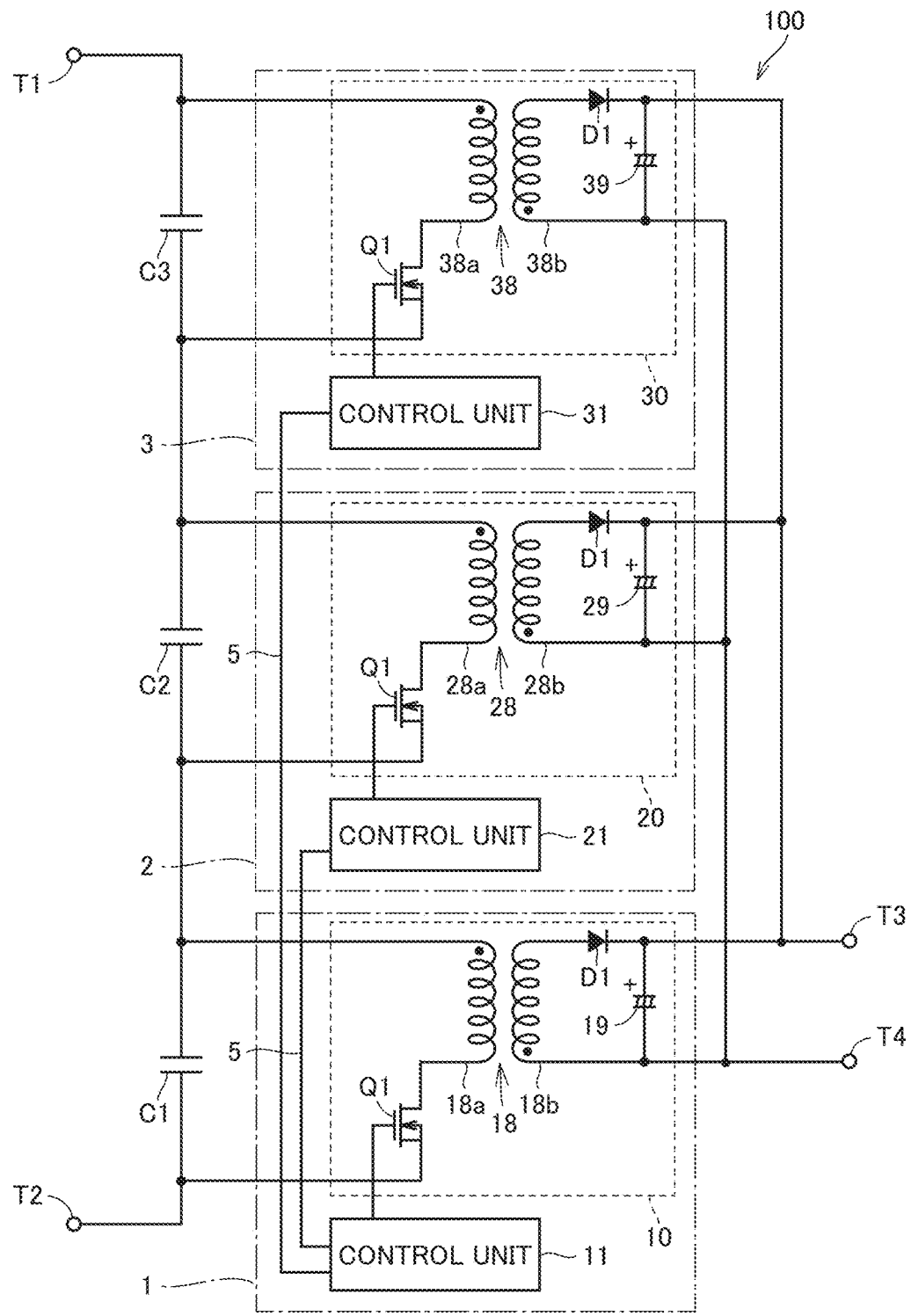
FIG. 11 is a schematic block diagram for illustrating an exemplary configuration of a self-power feed circuit according to a second embodiment.

FIG. 11 is a schematic block diagram for illustrating an exemplary configuration of a self-power feed circuit according to a second embodiment. Self-power feed circuit 100 according to the second embodiment differs from self-power feed circuit 100 shown in FIG. 2 in how signal line 5 connecting master converter 1 and slave converters 2 and 3 is configured.

Referring to FIG. 11, control unit 11 of master converter 1, control unit 21 of slave converter 2, and control unit 31 of slave converter 3 are star-connected by signal line 5. Therefore, control unit 11 can directly transmit a signal to each of control unit 21 and control unit 31 via signal line 5. Note that a signal insulation unit is connected to signal line 5, and a signal can be transmitted among control units 11, 21 and 31 in an electrically insulated state via the signal insulation unit.

Hereinafter a configuration of control units 11, 21 and 31 will be described with reference to FIG. 12. Each block shown in FIG. 12 has a function which can be implemented by at least one of software processing by the control unit and hardware processing.

Figure 12:
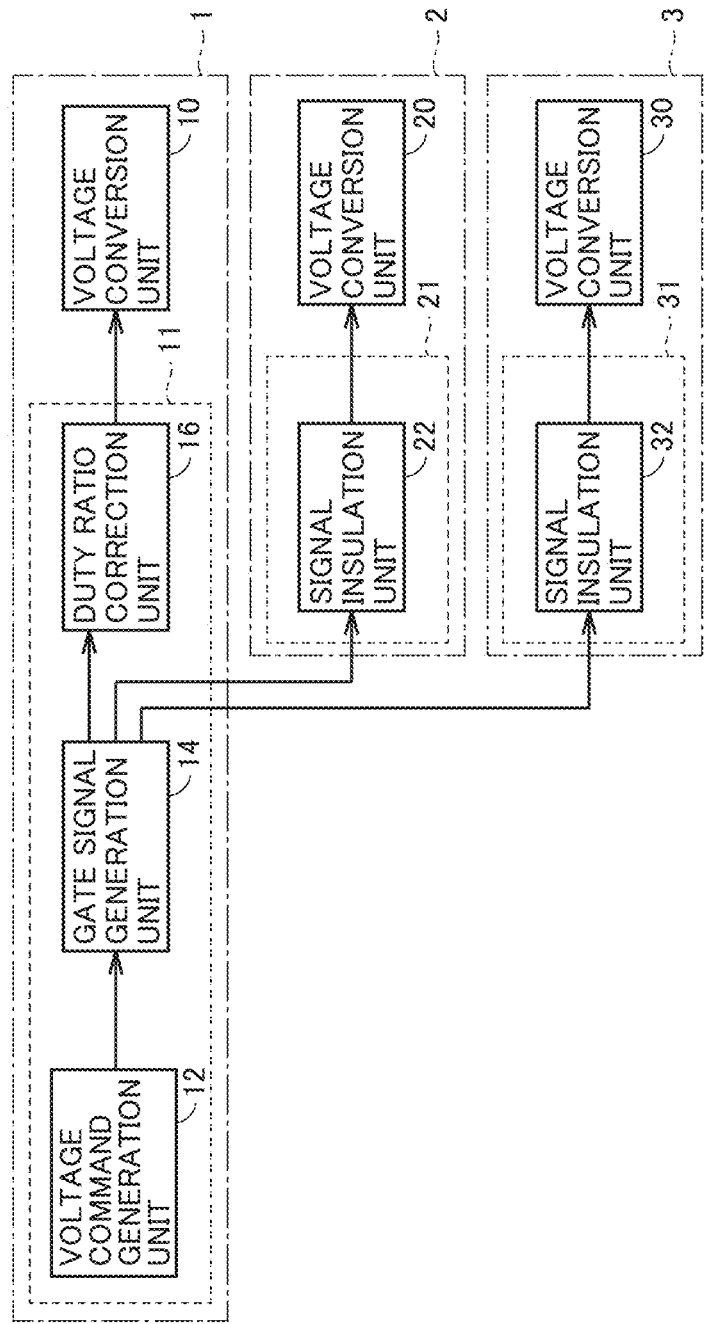
FIG. 12 is a block diagram for illustrating a configuration of a control unit in the self-power feed circuit according to the second embodiment.

Referring to FIG. 12, control unit 11 of master converter 1 and control unit 31 of slave converter 3 are similar in configuration to control unit 11 and control unit 31 shown in FIG. 3, respectively. In contrast, control unit 21 of slave converter 2 differs from control unit 21 shown in FIG. 3 in that the former does not include duty ratio correction unit 24.

As shown in FIG. 12, control unit 11 of master converter 1 includes voltage command generation unit 12, gate signal generation unit 14, and duty ratio correction unit 16. Voltage command generation unit 12 generates a voltage command, which indicates a target voltage for output voltage Vo of self-power feed circuit 100, and provides the generated voltage command to gate signal generation unit 14.

Gate signal generation unit 14 generates a gate signal based on the voltage command generated by voltage command generation unit 12. The generated gate signal will serve as a gate signal common among voltage conversion units 10, 20, and 30. Gate signal generation unit 14 outputs the generated gate signal to duty ratio correction unit 16 and also transmits the generated gate signal to control unit 21 of slave converter 2 and control unit 31 of slave converter 3 via signal line 5. Duty ratio correction unit 16 will be described hereinafter.

In slave converter 2, control unit 21 includes signal insulation unit 22. Signal insulation unit 22 is provided at signal line 5 connecting control unit 11 and control unit 21 and is configured to transmit a signal while ensuring electrical insulation between control unit 11 and control unit 21.

In slave converter 3, control unit 31 includes signal insulation unit 32. Signal insulation unit 32 is provided at signal line 5 connecting control unit 11 and control unit 31 and is configured to transmit a signal while ensuring electrical insulation between control unit 11 and control unit 31.

Signal insulation units 22 and 32 can be composed for example of a photocoupler, a digital isolator, or the like. When signal insulation unit 22 receives the gate signal from gate signal generation unit 14 of control unit 11, signal insulation unit 22 outputs the gate signal to voltage conversion unit 20. Voltage conversion unit 20 is driven in response to the gate signal.

When signal insulation unit 32 receives the gate signal from gate signal generation unit 14 of control unit 11, signal insulation unit 32 outputs the gate signal to voltage conversion unit 30. Voltage conversion unit 30 is driven in response to the gate signal.

In the second embodiment, the gate signal generated by control unit 11 of master converter 1 is transmitted to control unit 21 of slave converter 2 by signal insulation unit 22 and also transmitted to control unit 31 of slave converter 3 by signal insulation unit 32, and control units 11, 21 and 31 can thus use the common gate signal to drive voltage conversion units 10, 20 and 30, respectively.

Meanwhile, due to a response speed of each of signal insulation units 22 and 32, a difference may occur between duty ratio DR of the gate signal in master converter 1 and duty ratio DR of the gate signal transmitted to slave converter 2 via signal insulation unit 22. Similarly, a difference may occur between duty ratio DR of the gate signal in master converter 1 and duty ratio DR2 of the gate signal transmitted to slave converter 3 via signal insulation unit 32. Due to these differences of the duty ratios, there is a concern that any of capacitors C1 to C3 may suffer overvoltage.

Accordingly, self-power feed circuit 100 according to the second embodiment is configured to correct duty ratio DR in master converter 1 such that duty ratio DR in master converter 1 and duty ratios DR1 and DR2 in slave converters 2 and 3 match.

In the exemplary configuration of FIGS. 11 and 12, the correction means is configured to correct duty ratio DR in master converter 1 so as to match duty ratio DR1 in slave converter 2 and duty ratio DR2 in slave converter 3. Such a correction means is implemented by duty ratio correction unit 16 for correcting duty ratio DR in master converter 1.

Figure 13:
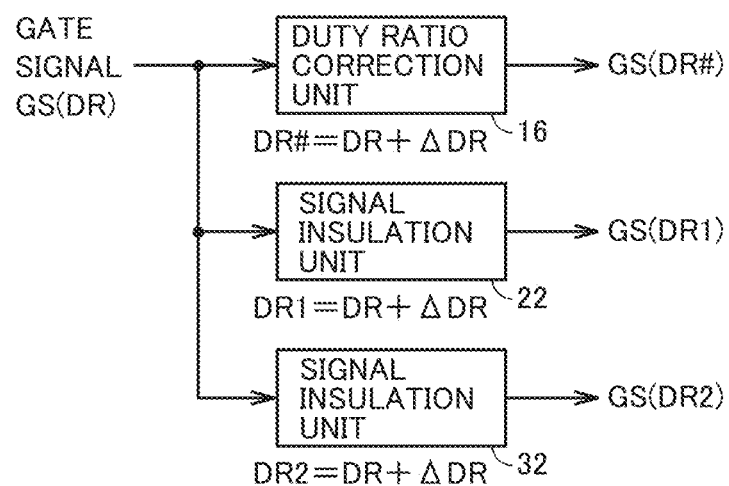
FIG. 13 is a diagram for illustrating a duty ratio correcting process in a duty ratio correction unit.

FIG. 13 is a diagram for illustrating a duty ratio correcting process in duty ratio correction unit 16.

Referring to FIG. 13, duty ratio correction unit 16 and signal insulation units 22, 32 receive gate signal GS of duty ratio DR from gate signal generation unit 14. When signal insulation unit 22 receives gate signal GS of duty ratio DR, signal insulation unit 22 outputs gate signal GS to voltage conversion unit 20 (not shown). It is assumed that duty ratio DR1 of gate signal GS output from signal insulation unit 22 has a difference of ΔDR from duty ratio DR of gate signal GS input to signal insulation unit 22 (i.e., DR1=DR+ΔDR).

When signal insulation unit 32 receives gate signal GS of duty ratio DR, signal insulation unit 32 outputs gate signal GS to voltage conversion unit 30 (not shown). It is assumed that duty ratio DR2 of gate signal GS output from signal insulation unit 32 has a difference of ΔDR from duty ratio DR of gate signal GS input to signal insulation unit 32 (i.e., DR2=DR+ΔDR).

Duty ratio correction unit 16 corrects duty ratio DR of gate signal GS generated by gate signal generation unit 14 so as to match duty ratios DR1, DR2. Assuming that the corrected duty ratio is DR #, DR # will be duty ratio DR with difference ΔDR added thereto (i.e., DR #=DR+ΔDR). Duty ratio correction unit 16 outputs the corrected gate signal GS to voltage conversion unit 10 (not shown).

According to this, duty ratio DR # of gate signal GS output to voltage conversion unit 10, duty ratio DR1 of gate signal GS output to voltage conversion unit 20, and duty ratio DR2 of gate signal GS output to voltage conversion unit 30 will all be DR+ΔDR and thus match one another. Accordingly, voltage conversion units 10, 20, and 30 can have their voltage conversion ratios matched to one another, and variation of capacitor voltages E1 to E3 can be suppressed.

Thus, the self-power feed circuit according to the second embodiment can provide an effect similar to that of the self-power feed circuit according to the first embodiment. Further, according to the self-power feed circuit according to the second embodiment, the plurality of DC/DC converters 1 to 3 have control units 11, 21 and 31 star-connected, and providing the correction means only in master converter 1 suffices. This allows the self-power feed circuit to be further miniaturized.

While in the second embodiment an exemplary configuration in which three DC/DC converters have their control units star-connected has been described, a configuration in which N DC/DC converters (N≥4) have their control units star-connected can also have one DC/DC converter thereof to serve as a master converter and generate a gate signal which is in turn transmitted to the remaining (N−1) slave converters via signal line 5 directly to enable similar control. In the star type connection, a single signal insulation unit is interposed between the master converter and each slave converter regardless of the number of slave converters, and the control unit of the master converter will correct duty ratio DR of the gate signal in master converter 1 so as to add difference ΔDR of a duty ratio caused by the single signal insulation unit.

Third Embodiment

Figure 14:
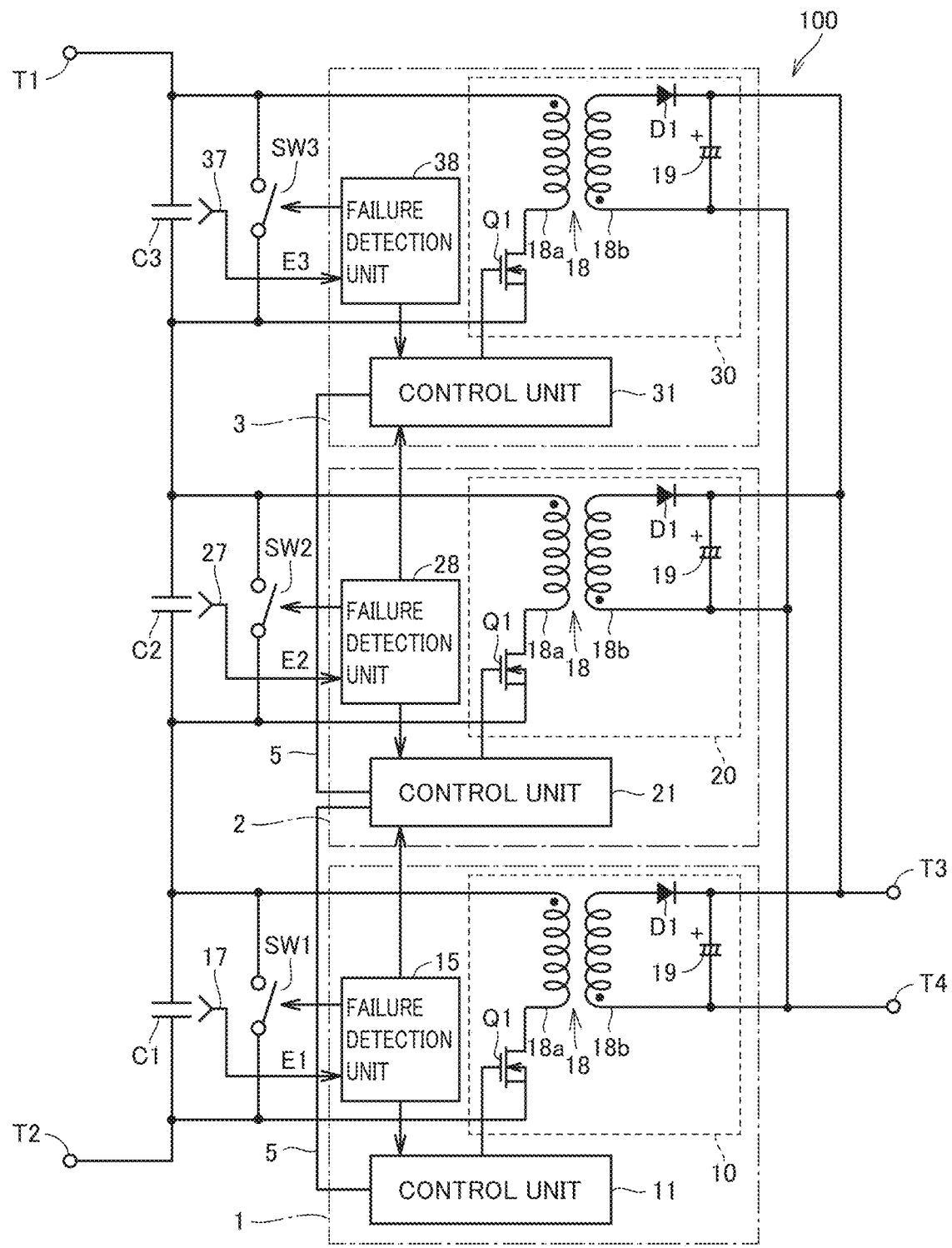
FIG. 14 is a schematic block diagram for illustrating an exemplary configuration of a self-power feed circuit according to a third embodiment.

FIG. 14 is a schematic block diagram for illustrating an exemplary configuration of a self-power feed circuit according to a third embodiment. Self-power feed circuit 100 according to the third embodiment differs from self-power feed circuit 100 according to the first embodiment shown in FIGS. 1 and 2 in that the former further comprises voltage detectors 17, 27 and 37, failure detection units 15, 28, and 38, and short-circuit switches SW1 to SW3.

Referring to FIG. 14, voltage detector 17 detects voltage E1 applied to capacitor C1 and provides a signal indicating the detected value to master converter 1. Voltage detector 27 detects voltage E2 applied to capacitor C2 and provides a signal indicating the detected value to slave converter 2. Voltage detector 37 detects voltage E3 applied to capacitor C3 and provides a signal indicating the detected value to slave converter 3. Voltage detectors 17, 27, and 37 can for example be a detector, such as a voltmeter having a Hall element for example, configured to be capable of detecting direct-current voltage.

Master converter 1 includes failure detection unit 15. Failure detection unit 15 determines whether capacitor C1 and voltage conversion unit 10 have failed based on voltage E1 of capacitor C1 detected by voltage detector 17. Specifically, failure detection unit 15 compares voltage E1 of capacitor C1 with a threshold value for failure determination. The threshold value for failure determination includes a first value corresponding to excessively small voltage and a second value corresponding to overvoltage. When voltage E1 of capacitor C1 is smaller than the first value or when voltage E1 is larger than the second value, failure detection unit 15 determines that capacitor C1 or voltage conversion unit 10 has failed. When failure detection unit 15 detects that capacitor C1 or voltage conversion unit 10 has failed, failure detection unit 15 outputs a failure detection signal to control unit 11 of master converter 1 and control unit 21 of slave converter 2.

Short-circuit switch SW1 is connected to capacitor C1 in parallel. Short-circuit switch SW1 is controlled by failure detection unit 15. Short-circuit switch SW1 is switched off (or interrupted) when capacitor C1 and voltage conversion unit 10 are normal, and short-circuit switch SW1 is switched on (or conducts) when a failure of capacitor C1 or voltage conversion unit 10 is detected. When short-circuit switch SW1 is switched on, the terminals of capacitor C1 are short-circuited, and voltage conversion unit 10 is bypassed.

Slave converter 2 includes failure detection unit 28. Failure detection unit 28 determines whether capacitor C2 and voltage conversion unit 20 have failed based on voltage E2 of capacitor C2 detected by voltage detector 27. How failure detection unit 28 determines a failure is similar to how failure detection unit 15 determines a failure. When failure detection unit 28 detects a failure of capacitor C2 or voltage conversion unit 20, failure detection unit 28 outputs a failure detection signal to control unit 21 of slave converter 2 and control unit 31 of slave converter 3.

Short-circuit switch SW2 is connected to capacitor C2 in parallel. Short-circuit switch SW2 is controlled by failure detection unit 28. Short-circuit switch SW2 is switched off when capacitor C2 and voltage conversion unit 20 are normal, and short-circuit switch SW2 is switched on when a failure of capacitor C2 or voltage conversion unit 20 is detected. When short-circuit switch SW2 is switched on, the terminals of capacitor C2 are short-circuited, and voltage conversion unit 20 is bypassed.

Slave converter 3 includes failure detection unit 38. Failure detection unit 38 determines whether capacitor C3 and voltage conversion unit 30 have failed based on voltage E3 of capacitor C3 detected by voltage detector 37. How failure detection unit 38 determines a failure is similar to how failure detection unit 15 determines a failure. When failure detection unit 38 detects a failure of capacitor C3 or voltage conversion unit 30, failure detection unit 38 outputs a failure detection signal to control unit 31 of slave converter 3.

Short-circuit switch SW3 is connected to capacitor C3 in parallel. Short-circuit switch SW3 is controlled by failure detection unit 38. Short-circuit switch SW3 is switched off when capacitor C3 and voltage conversion unit 30 are normal, and short-circuit switch SW3 is switched on when a failure of capacitor C3 or voltage conversion unit 30 is detected. When short-circuit switch SW3 is switched on, the terminals of capacitor C3 are short-circuited, and voltage conversion unit 30 is bypassed.

When short-circuit switches SW1 to SW3 are thus connected to capacitors C1 to C3, respectively, in parallel, and any one of capacitors C1 to C3 fails or any one of voltage conversion units 10 to 30 fails, short-circuit switch SW associated with the failed capacitor or voltage conversion unit can be switched on to bypass the failed capacitor or voltage conversion unit. Thus, self-power feed circuit 100 can continue to operate even after a failure of a capacitor or a voltage conversion unit is detected.

However, when master converter 1 fails, master converter 1 does not generate a gate signal, and master converter 1 cannot transmit the gate signal to slave converters 2 and 3.

Accordingly, in self-power feed circuit 100 according to the third embodiment, slave converter 2 is operated as a master converter instead of the failed master converter 1. That is, slave converter 2 generates a gate signal and transmits the generated gate signal to slave converter 3 of a lower level.

Figure 15:
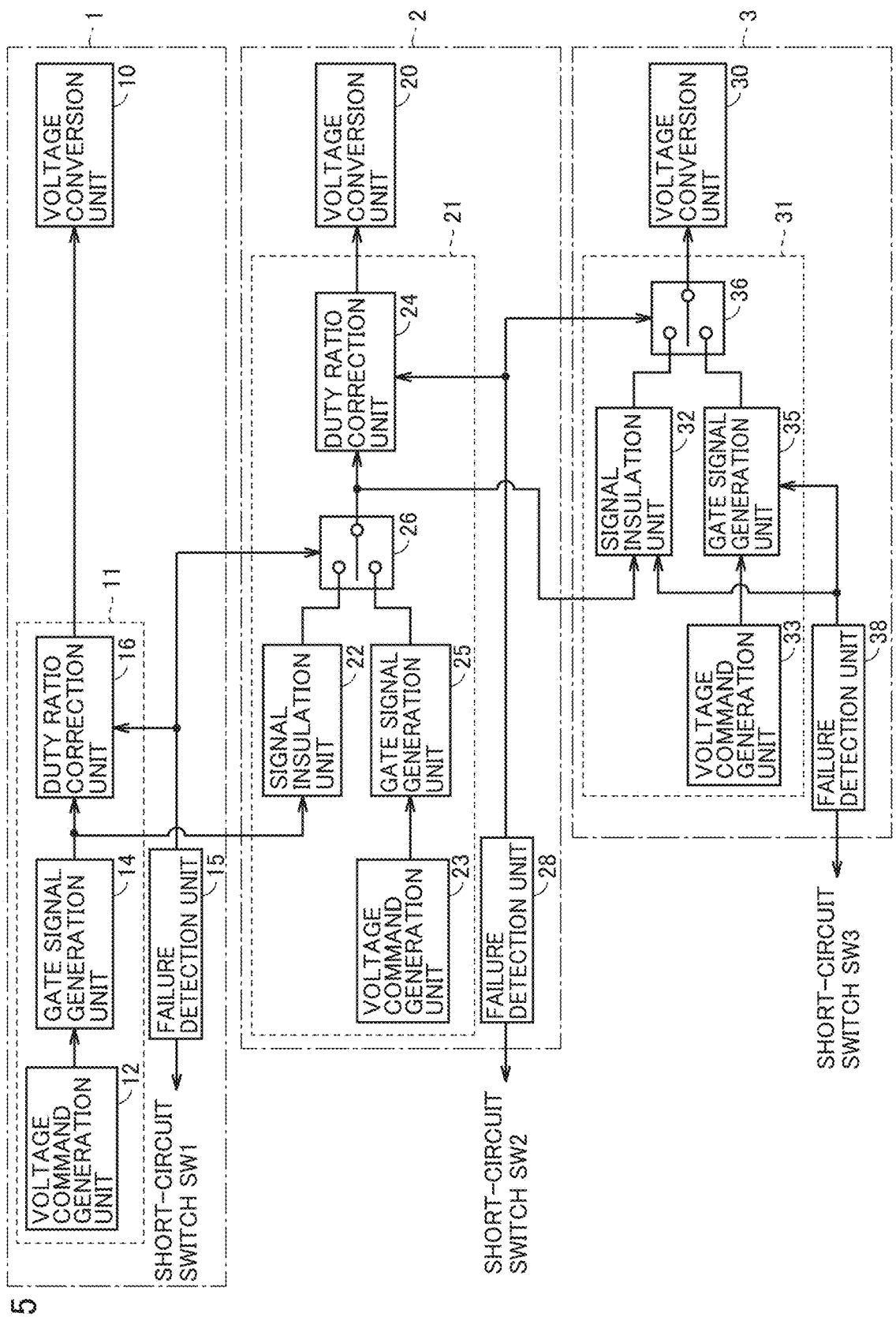
FIG. 15 is a block diagram for illustrating a configuration of a control unit in the self-power feed circuit according to the third embodiment.

Reference will now be made to FIG. 15 to describe a configuration of control units 11, 21 and 31. Each block shown in FIG. 15 has a function which can be implemented by at least one of software processing by the control unit and hardware processing.

Referring to FIG. 15, control unit 11 of master converter 1 is similar in configuration to control unit 11 shown in FIG. 3. In contrast, control unit 21 of slave converter 2 is different from control unit 21 shown in FIG. 3 in that the former further includes a voltage command generation unit 23, a gate signal generation unit 25, and a switching unit 26.

Control unit 31 of slave converter 3 is different from control unit 31 shown in FIG. 3 in that the former further includes a voltage command generation unit 33, a gate signal generation unit 35, and a switching unit 36.

In master converter 1, when failure detection unit 15 detects a failure of capacitor C1 or voltage conversion unit 10, failure detection unit 15 outputs a failure detection signal to duty ratio correction unit 16 and control unit 21 of slave converter 2. Furthermore, failure detection unit 15 switches on short-circuit switch SW1. When duty ratio correction unit 16 receives the failure detection signal from failure detection unit 15, duty ratio correction unit 16 provides a gate block signal to voltage conversion unit 10 to fix switching element Q1 to the OFF state.

In slave converter 2, voltage command generation unit 23 generates a voltage command, which indicates a target voltage for output voltage Vo of self-power feed circuit 100. Voltage command generation unit 23 is similar in configuration to voltage command generation unit 12 in control unit 11. The generated voltage command is provided to gate signal generation unit 25. Gate signal generation unit 25 generates a gate signal based on the voltage command generated by voltage command generation unit 23. Gate signal generation unit 25 is similar in configuration to gate signal generation unit 14 in control unit 11. Gate signal generation unit 25 inputs the generated gate signal to a first input terminal of switching unit 26. That is, slave converter 2 can per se generate a gate signal.

When signal insulation unit 22 receives a gate signal from gate signal generation unit 14 of control unit 11, signal insulation unit 22 inputs the gate signal to a second input terminal of switching unit 26. Switching unit 26 has an output terminal connected to duty ratio correction unit 24. Switching unit 26 is configured to select either the gate signal input to the first input terminal or the gate signal input to the second input terminal, based on the failure detection signal provided from failure detection unit 15 of master converter 1.

Specifically, when capacitor C1 and voltage conversion unit 10 are normal, switching unit 26 selects the gate signal input to the second input terminal, that is, the gate signal transmitted from gate signal generation unit 14 via signal insulation unit 22. In contrast, when capacitor C1 or voltage conversion unit 10 fails, switching unit 26 selects the gate signal input to the first input terminal, that is, the gate signal generated by gate signal generation unit 25. Switching unit 26 outputs the selected gate signal to duty ratio correction unit 24. Furthermore, switching unit 26 transmits the selected gate signal to control unit 31 of slave converter 3 via signal line 5.

Duty ratio correction unit 24 corrects duty ratio DR1 of the gate signal that is provided from switching unit 26 so as to match duty ratio DR2. Duty ratio correction unit 24 outputs the corrected gate signal to voltage conversion unit 20.

In slave converter 2, when failure detection unit 28 detects a failure of capacitor C2 or voltage conversion unit 20, failure detection unit 28 outputs a failure detection signal to duty ratio correction unit 24 and control unit 31 of slave converter 3. Furthermore, failure detection unit 28 switches on short-circuit switch SW2. When duty ratio correction unit 24 receives the failure detection signal from failure detection unit 28, duty ratio correction unit 24 provides a gate block signal to voltage conversion unit 20 to fix switching element Q1 to the OFF state.

In slave converter 3, voltage command generation unit 33 generates a voltage command, which indicates the target voltage for output voltage Vo of self-power feed circuit 100. Voltage command generation unit 33 is similar in configuration to voltage command generation unit 12 in control unit 11. The generated voltage command is provided to gate signal generation unit 35. Gate signal generation unit 35 generates a gate signal based on the voltage command generated by voltage command generation unit 33. Gate signal generation unit 35 is similar in configuration to gate signal generation unit 14 in control unit 11. Gate signal generation unit 35 inputs the generated gate signal to a first input terminal of switching unit 36. That is, slave converter 3 can per se generate a gate signal.

When signal insulation unit 32 receives a gate signal from switching unit 26 of control unit 21, signal insulation unit 32 inputs the gate signal to a second input terminal of switching unit 36. Switching unit 36 has an output terminal connected to voltage conversion unit 30. Switching unit 36 is configured to select either the gate signal input to the first input terminal or the gate signal input to the second input terminal, based on the failure detection signal provided from failure detection unit 28 of slave converter 2.

Specifically, when capacitor C2 and voltage conversion unit 20 are normal, switching unit 36 selects the gate signal input to the second input terminal, that is, the gate signal transmitted from switching unit 26 via signal insulation unit 32. In contrast, when capacitor C2 or voltage conversion unit 20 fails, switching unit 36 selects the gate signal input to the first input terminal, that is, the gate signal generated by gate signal generation unit 35. Switching unit 36 outputs the selected gate signal to voltage conversion unit 30.

In slave converter 3, when failure detection unit 38 detects a failure of capacitor C3 or voltage conversion unit 30, failure detection unit 38 outputs a failure detection signal to signal insulation unit 32 and gate signal generation unit 35. Furthermore, failure detection unit 38 switches on short-circuit switch SW3. When signal insulation unit 32 and gate signal generation unit 35 receive the failure detection signal from failure detection unit 38 signal insulation unit 32 and gate signal generation unit 35 provide a gate block signal to voltage conversion unit 30 to fix switching element Q1 to the OFF state.

Thus, the self-power feed circuit according to the third embodiment can continue to operate even when any of the plurality of capacitors fails or when any of the plurality of voltage conversion units fails.

Figure 16:
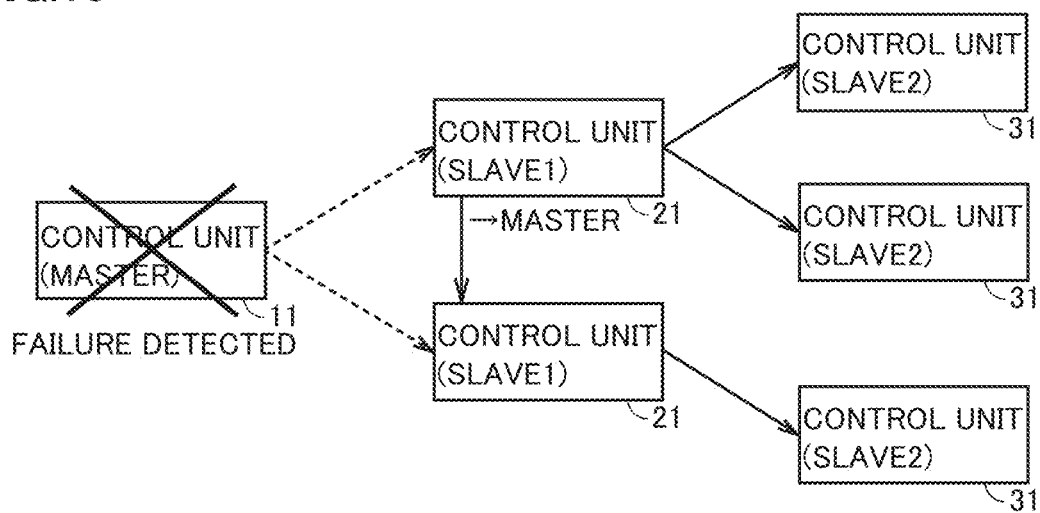
FIG. 16 is a schematic block diagram for illustrating an exemplary configuration of the control unit in the self-power feed circuit according to the third embodiment.

FIG. 16 shows an exemplary configuration in which the six DC/DC converters shown in FIG. 10 have their control units tree-connected. According to the self-power feed circuit according to the third embodiment, when the master converter fails, any one of slave converters of a higher level connected to the failed master converter is operated as a master converter. In the example of FIG. 16, one of the two slave converters connected to control unit 11 of the master converter is operated as a master converter. Specifically, in this one slave converter, control unit 21 generates a gate signal and transmits the generated gate signal to control unit 31 of another slave converter via a signal insulation unit (not shown).

In the above configuration, the correction means corrects each of a duty ratio in the new master converter and a duty ratio in a slave converter higher in level than a lowest level so as to match a duty ratio in a slave converter of the lowest level. In the exemplary configuration of FIG. 16, two signal insulation units are interposed between the new master converter and slave converters of the lowest level. Therefore, control unit 21 of the new master converter corrects duty ratio DR of the gate signal in the master converter so as to add a sum of differences ΔDR of the duty ratios caused by the two signal insulation units.

Furthermore, in the exemplary configuration of FIG. 16, a single signal insulation unit will be interposed between a slave converter of the higher level connected to the new master converter and a slave converter of the lowest level. Accordingly, control unit 21 of the slave converter of the higher level will correct duty ratio DR of the gate signal in the slave converter of the higher level so as to add difference ΔDR of the duty ratio caused by the single signal insulation unit.

According to this, even when the master converter fails, five slave converters can have their voltage conversion ratios matched to one another. As a result, variation in voltage of five voltage dividing capacitors to which the five slave converters are connected can be suppressed.

Fourth Embodiment

In the third embodiment has been described a configuration in which the plurality of DC/DC converters 1 to 3 are tree-connected, and when master converter 1 fails, then, of slave converters 2 and 3, slave converter 2 of a higher level is operated as a master converter.

In a fourth embodiment will be described a first manner of operation when master converter 1 fails in a configuration in which the plurality of DC/DC converters 1 to 3 are star-connected.

Figure 17:
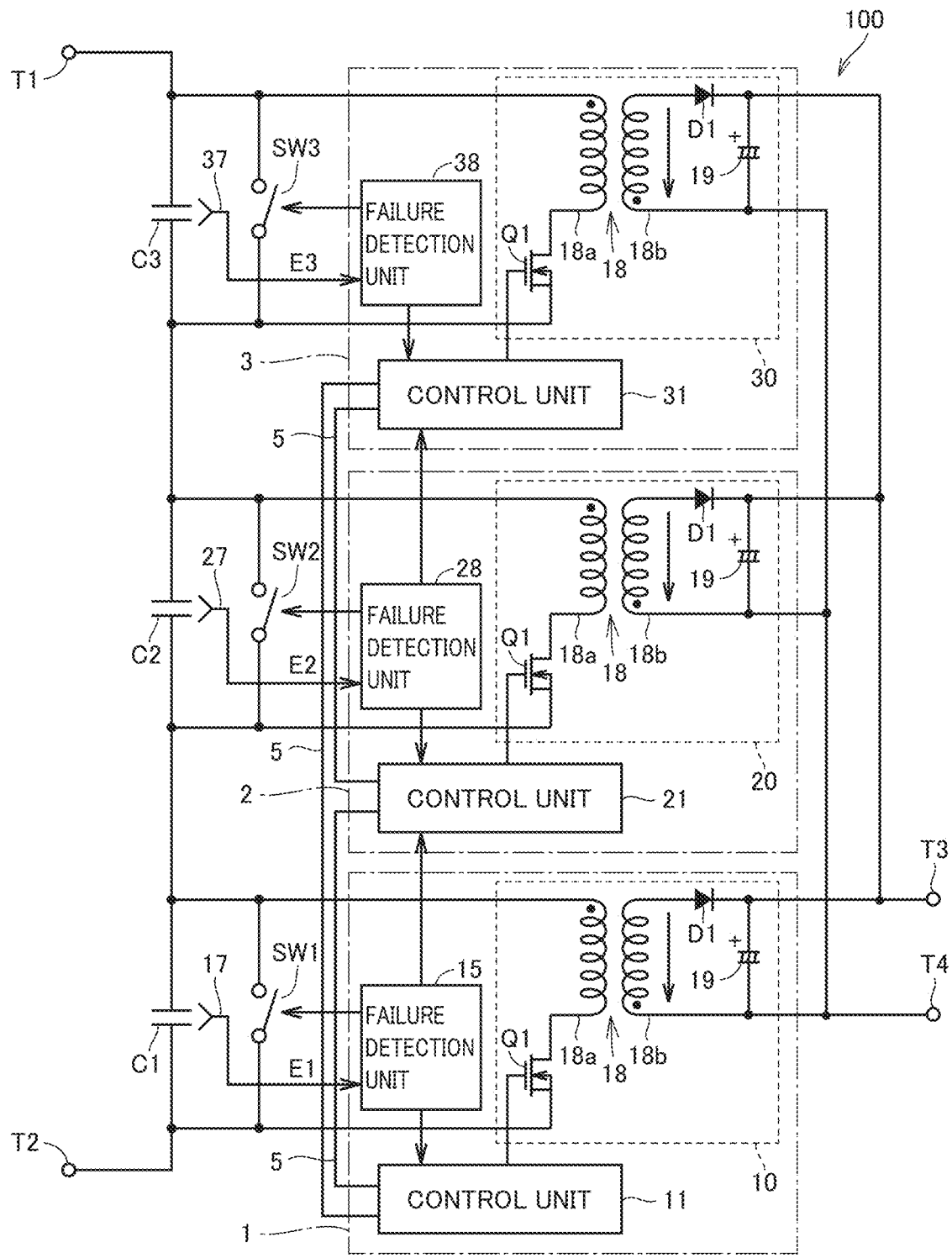
FIG. 17 is a schematic block diagram for illustrating an exemplary configuration of a self-power feed circuit according to a fourth embodiment.

FIG. 17 is a schematic block diagram for illustrating an exemplary configuration of a self-power feed circuit according to the fourth embodiment. Self-power feed circuit 100 according to the fourth embodiment differs from self-power feed circuit 100 according to the second embodiment shown in FIGS. 11 and 12 in that the former further includes voltage detectors 17, 27 and 37, failure detection units 15, 28 and 38, and short-circuit switches SW1 to SW3. Furthermore, the former differs from the latter in that control unit 21 of slave converter 2 and control unit 31 of slave converter 3 are connected by signal line 5.

Note that voltage detectors 17, 27, 37, failure detection units 15, 28, 38, and short-circuit switches SW1 to SW3 are the same as voltage detectors 17, 27, 37, failure detection units 15, 28, 38, and short-circuit switches SW1 to SW3 shown in FIG. 14, respectively.

That is, self-power feed circuit 100 according to the fourth embodiment also has short-circuit switches SW1 to SW3 connected to capacitors C1 to C3, respectively, in parallel. When any one of capacitors C1 to C3 fails or any one of voltage conversion units 10 to 30 fails, short-circuit switch SW associated with the failed capacitor or voltage conversion unit can be switched on to bypass the failed capacitor or voltage conversion unit. Thus, self-power feed circuit 100 can continue to operate even after a failure of a capacitor or a voltage conversion unit is detected.

However, when master converter 1 fails, master converter 1 does not generate a gate signal, and master converter 1 cannot transmit the gate signal to slave converters 2 and 3.

Accordingly, in self-power feed circuit 100 according to the fourth embodiment, instead of the failed master converter 1, either one of slave converters 2 and 3 generates a gate signal, and transmits the generated gate signal to the other slave converter. In the following description, slave converter 2 generates the gate signal for the sake of illustration.

Figure 18:
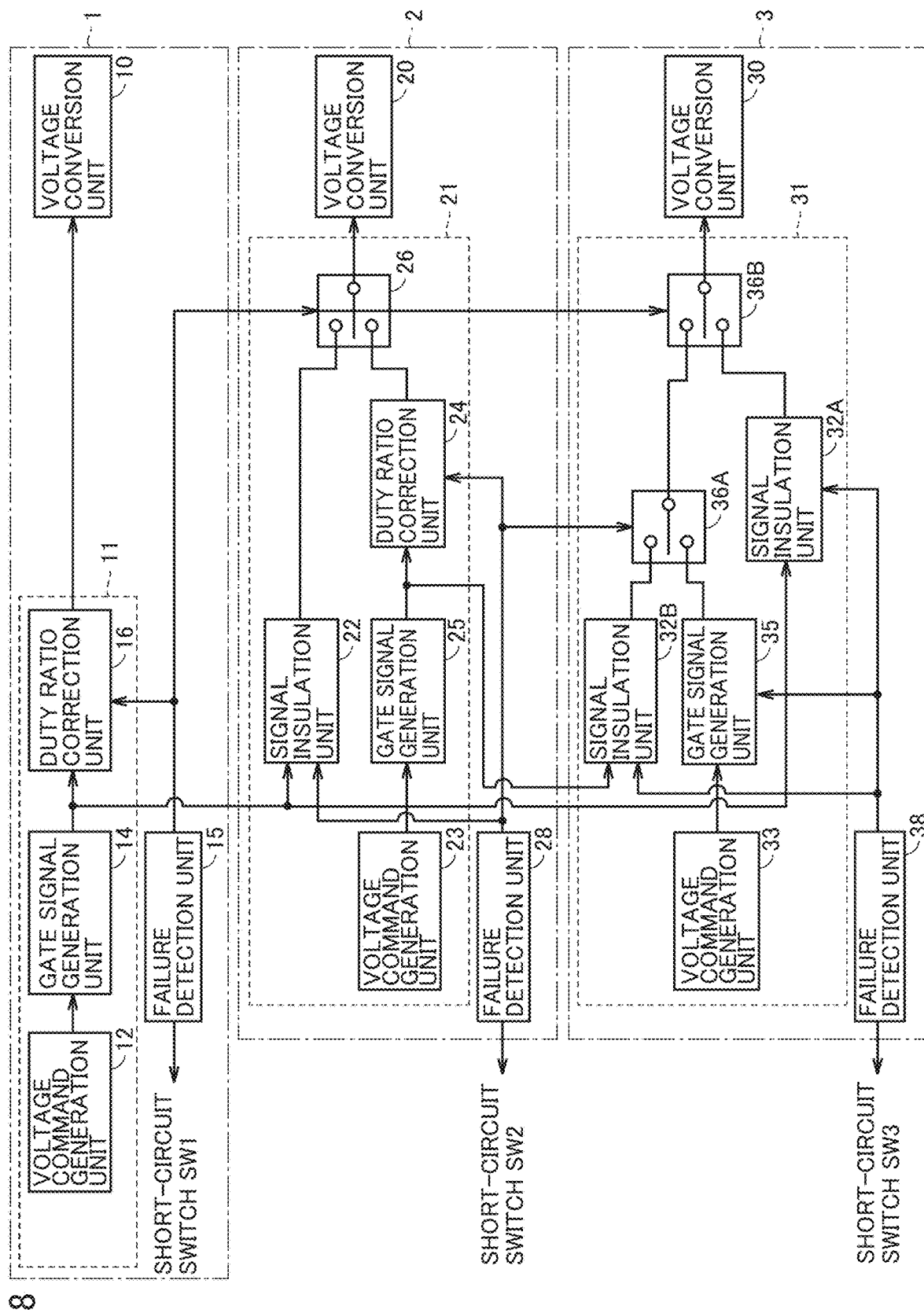
FIG. 18 is a block diagram for illustrating a configuration of a control unit in the self-power feed circuit according to the fourth embodiment.

Reference will now be made to FIG. 18 to describe a configuration of control units 11, 21 and 31. Each block shown in FIG. 18 has a function which can be implemented by at least one of software processing by the control unit and hardware processing.

Referring to FIG. 18, control unit 11 of master converter 1 is similar in configuration to control unit 11 shown in FIG. 12. In contrast, control unit 21 of slave converter 2 is different from control unit 21 shown in FIG. 12 in that the former further includes voltage command generation unit 23, gate signal generation unit 25, duty ratio correction unit 24, and switching unit 26.

Furthermore, control unit 31 of slave converter 3 is different from control unit 31 shown in FIG. 12 in that the former further includes signal insulation units 32A and 32B, voltage command generation unit 33, gate signal generation unit 35, and switching units 36A and 36B.

In master converter 1, when failure detection unit 15 detects a failure of capacitor C1 or voltage conversion unit 10, failure detection unit 15 outputs a failure detection signal to duty ratio correction unit 16 and control unit 21 of slave converter 2. Furthermore, failure detection unit 15 switches on short-circuit switch SW1. When duty ratio correction unit 16 receives the failure detection signal from failure detection unit 15, duty ratio correction unit 16 provides a gate block signal to voltage conversion unit 10 to fix switching element Q1 to the OFF state.

In slave converter 2, voltage command generation unit 23 generates a voltage command, which indicates a target voltage for output voltage Vo of self-power feed circuit 100. Voltage command generation unit 23 is similar in configuration to voltage command generation unit 12 in control unit 11. The generated voltage command is provided to gate signal generation unit 25. Gate signal generation unit 25 generates a gate signal based on the voltage command generated by voltage command generation unit 23. Gate signal generation unit 25 is similar in configuration to gate signal generation unit 14 in control unit 11. Gate signal generation unit 25 outputs the generated gate signal to duty ratio correction unit 24 and also transmits the generated gate signal to control unit 31 of slave converter 3 via signal line 5.

Duty ratio correction unit 24 corrects duty ratio DR1 of the gate signal provided from gate signal generation unit 25 so as to match duty ratio DR2. Duty ratio correction unit 24 inputs the corrected gate signal to the first input terminal of switching unit 26.

When signal insulation unit 22 receives a gate signal from gate signal generation unit 14 of control unit 11, signal insulation unit 22 inputs the gate signal to the second input terminal of switching unit 26. Switching unit 26 is configured to select either the gate signal input to the first input terminal or the gate signal input to the second input terminal, based on the failure detection signal provided from failure detection unit 15 of master converter 1.

Specifically, when capacitor C1 and voltage conversion unit 10 are normal, switching unit 26 selects the gate signal input to the second input terminal, that is, the gate signal transmitted from gate signal generation unit 14 via signal insulation unit 22. In contrast, when capacitor C1 or voltage conversion unit 10 fails, switching unit 26 selects the gate signal input to the first input terminal, that is, the gate signal corrected by duty ratio correction unit 24. Switching unit 26 outputs the selected gate signal to voltage conversion unit 20.

In slave converter 2, when failure detection unit 28 detects a failure of capacitor C2 or voltage conversion unit 20, failure detection unit 28 outputs a failure detection signal to duty ratio correction unit 24, signal insulation unit 22, and control unit 31 of slave converter 3. Furthermore, failure detection unit 28 switches on short-circuit switch SW2. When duty ratio correction unit 24 and signal insulation unit 22 receive the failure detection signal from failure detection unit 28, duty ratio correction unit 24 and signal insulation unit 22 provide a gate block signal to voltage conversion unit 20 to fix switching element Q1 to the OFF state.

In slave converter 3, voltage command generation unit 33 generates a voltage command, which indicates the target voltage for output voltage Vo of self-power feed circuit 100. Voltage command generation unit 33 is similar in configuration to voltage command generation unit 12 in control unit 11. The generated voltage command is provided to gate signal generation unit 35. Gate signal generation unit 35 generates a gate signal based on the voltage command generated by voltage command generation unit 33. Gate signal generation unit 35 is similar in configuration to gate signal generation unit 14 in control unit 11. Gate signal generation unit 35 inputs the generated gate signal to a first input terminal of switching unit 36A. That is, slave converter 3 can per se generate the gate signal.

When signal insulation unit 32B receives a gate signal from gate signal generation unit 25 of control unit 21, signal insulation unit 32B inputs the gate signal to a second input terminal of switching unit 36A. Switching unit 36A has an output terminal connected to a first input terminal of switching unit 36B. Switching unit 36A is configured to select either the gate signal input to the first input terminal or the gate signal input to the second input terminal, based on the failure detection signal provided from failure detection unit 28 of slave converter 2.

Specifically, when capacitor C2 and voltage conversion unit 20 are normal, switching unit 36A selects the gate signal input to the second input terminal, that is, the gate signal transmitted from gate signal generation unit 25 via signal insulation unit 32B. In contrast, when capacitor C2 or voltage conversion unit 20 fails, switching unit 36A selects the gate signal input to the first input terminal, that is, the gate signal generated by gate signal generation unit 35. Switching unit 36A inputs the selected gate signal to the first input terminal of switching unit 36B.

When signal insulation unit 32A receives a gate signal from gate signal generation unit 14 of control unit 11, signal insulation unit 32A inputs the gate signal to a second input terminal of switching unit 36B. Switching unit 36B has an output terminal connected to voltage conversion unit 30. Switching unit 36B is configured to select either the gate signal input to the first input terminal or the gate signal input to the second input terminal, based on the failure detection signal provided from failure detection unit 15 of master converter 1.

Specifically, when capacitor C1 and voltage conversion unit 10 are normal, switching unit 36B selects the gate signal input to the second input terminal, that is, the gate signal transmitted from gate signal generation unit 14 via signal insulation unit 32A. In contrast, when capacitor C1 or voltage conversion unit 10 fails, switching unit 36B selects the gate signal input to the first input terminal, that is, the gate signal generated by gate signal generation unit 25 of control unit 21, or the gate signal generated by gate signal generation unit 35 of control unit 31. Switching unit 36B outputs the selected gate signal to voltage conversion unit 30.

In slave converter 3, when failure detection unit 38 detects a failure of capacitor C3 or voltage conversion unit 30, failure detection unit 38 outputs a failure detection signal to gate signal generation unit 35 and signal insulation units 32A and 32B. Furthermore, failure detection unit 38 switches on short-circuit switch SW3. When gate signal generation unit 35 and signal insulation units 32A and 32B receive the failure detection signal from failure detection unit 38, gate signal generation unit 35 and signal insulation units 32A and 32B provide a gate block signal to voltage conversion unit 30 to fix switching element Q1 to the OFF state.

Figure 19:
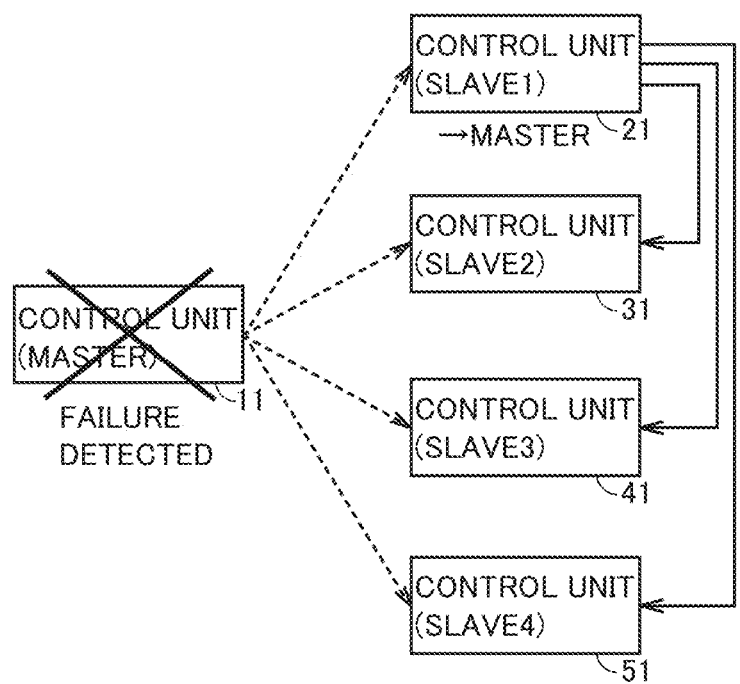
FIG. 19 is a schematic block diagram for illustrating an exemplary configuration of the control unit in the self-power feed circuit according to the fourth embodiment.

Self-power feed circuit 100 according to the fourth embodiment can thus provide an effect similar to that of the self-power feed circuit according to the third embodiment. FIG. 19 shows an exemplary configuration in which five DC/DC converters have their control units star-connected. When the master converter fails, any one of the four slave converters is operated as a master converter. In the example of FIG. 19, control unit 21 of a slave converter generates a gate signal and transmits the generated gate signal to the control units 31, 41 and 51 of the remaining slave converters.

Note that, as shown in FIG. 18, control unit 21 of slave converter 2 which operates as a master converter is provided with duty ratio correction unit 24. Duty ratio correction unit 24 corrects duty ratio DR1 of gate signal GS generated by gate signal generation unit 25 so as to match duty ratio DR2 of gate signal GS transmitted to control unit 31 of slave converter 3 via signal insulation unit 32B. Assuming that the corrected duty ratio is DR1 #, DR1 # will be duty ratio DR1 with difference ΔDR added thereto (i.e., DR1 #=DR1+ΔDR). Duty ratio correction unit 24 outputs the corrected gate signal GS to voltage conversion unit 20 via switching unit 26.

According to this, even when master converter 1 fails, duty ratio DR1 # of gate signal GS output to voltage conversion unit 20 and duty ratio DR2 of gate signal GS output to voltage conversion unit 30 will both be DR1+ΔDR and thus match each other. Accordingly, voltage conversion units 20 and 30 can have their voltage conversion ratios matched to each other, and variation of capacitor voltages E2 to E3 can be suppressed.

In the example of FIG. 19, even when the master converter fails, four slave converters can have their voltage conversion ratios matched to one another. As a result, variation in voltage of four voltage dividing capacitors to which the four slave converters are connected can be suppressed.

Fifth Embodiment

In a fifth embodiment will be described a second manner of operation when master converter 1 fails in a configuration in which the plurality of DC/DC converters 1 to 3 are star-connected.

Figure 20:
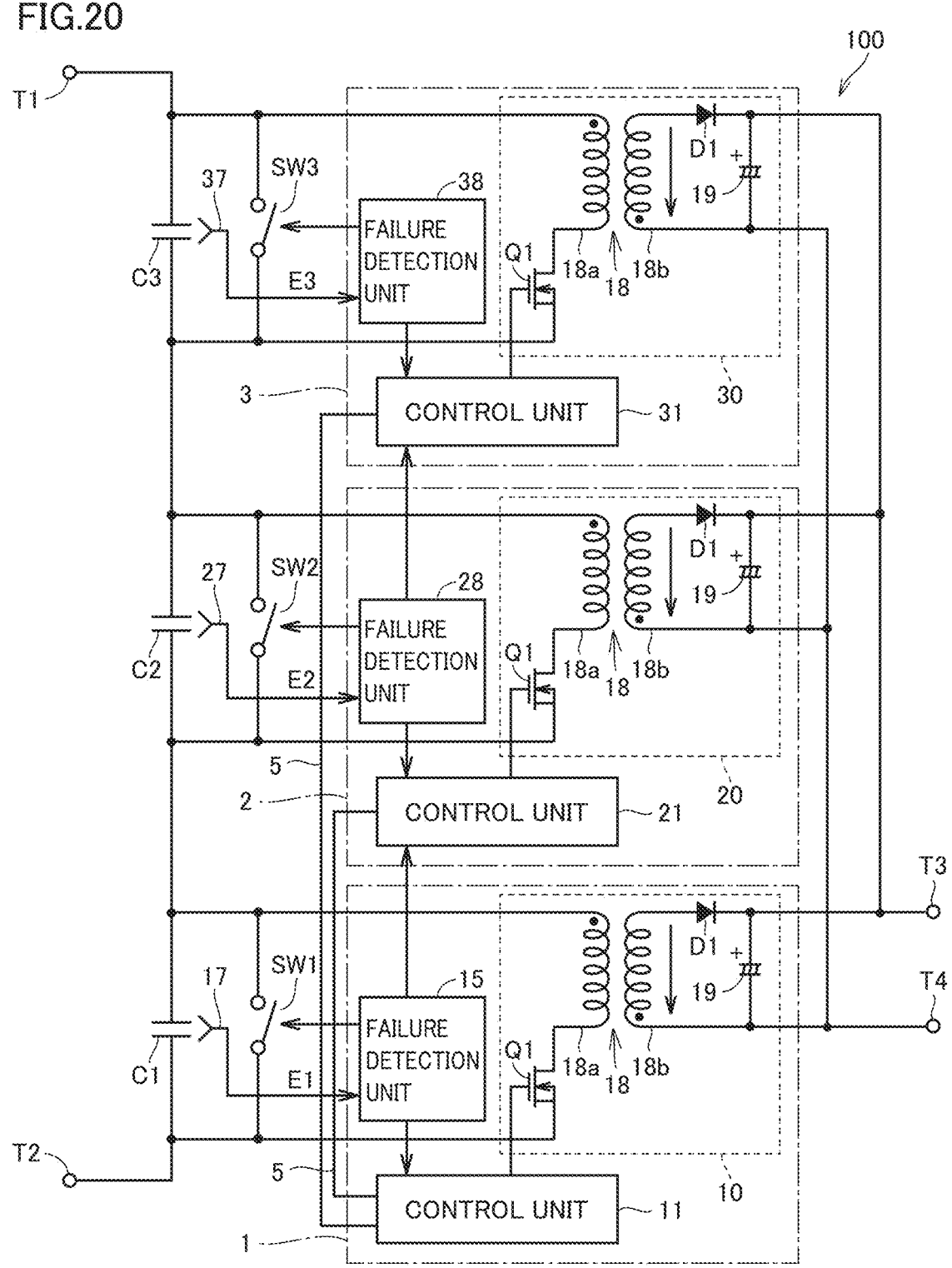
FIG. 20 is a schematic block diagram for illustrating an exemplary configuration of a self-power feed circuit according to a fifth embodiment.

FIG. 20 is a schematic block diagram for illustrating an exemplary configuration of a self-power feed circuit according to the fifth embodiment. Self-power feed circuit 100 according to the fifth embodiment differs from self-power feed circuit 100 according to the fourth embodiment shown in FIG. 17 in that, in the former, control unit 21 of slave converter 2 and control unit 31 of slave converter 3 are not connected by signal line 5.

That is, self-power feed circuit 100 according to the fifth embodiment also has short-circuit switches SW1 to SW3 connected to capacitors C1 to C3, respectively, in parallel. When any one of capacitors C1 to C3 fails or any one of voltage conversion units 10 to 30 fails, short-circuit switch SW associated with the failed capacitor or voltage conversion unit can be switched on to bypass the failed capacitor or voltage conversion unit. Thus, self-power feed circuit 100 can continue to operate even after a failure of a capacitor or a voltage conversion unit is detected.

However, when master converter 1 fails, master converter 1 does not generate a gate signal, and master converter 1 cannot transmit the gate signal to slave converters 2 and 3.

Accordingly, in self-power feed circuit 100 according to the fifth embodiment, instead of the failed master converter 1, each of slave converters 2 and 3 generates a gate signal.

Figure 21:
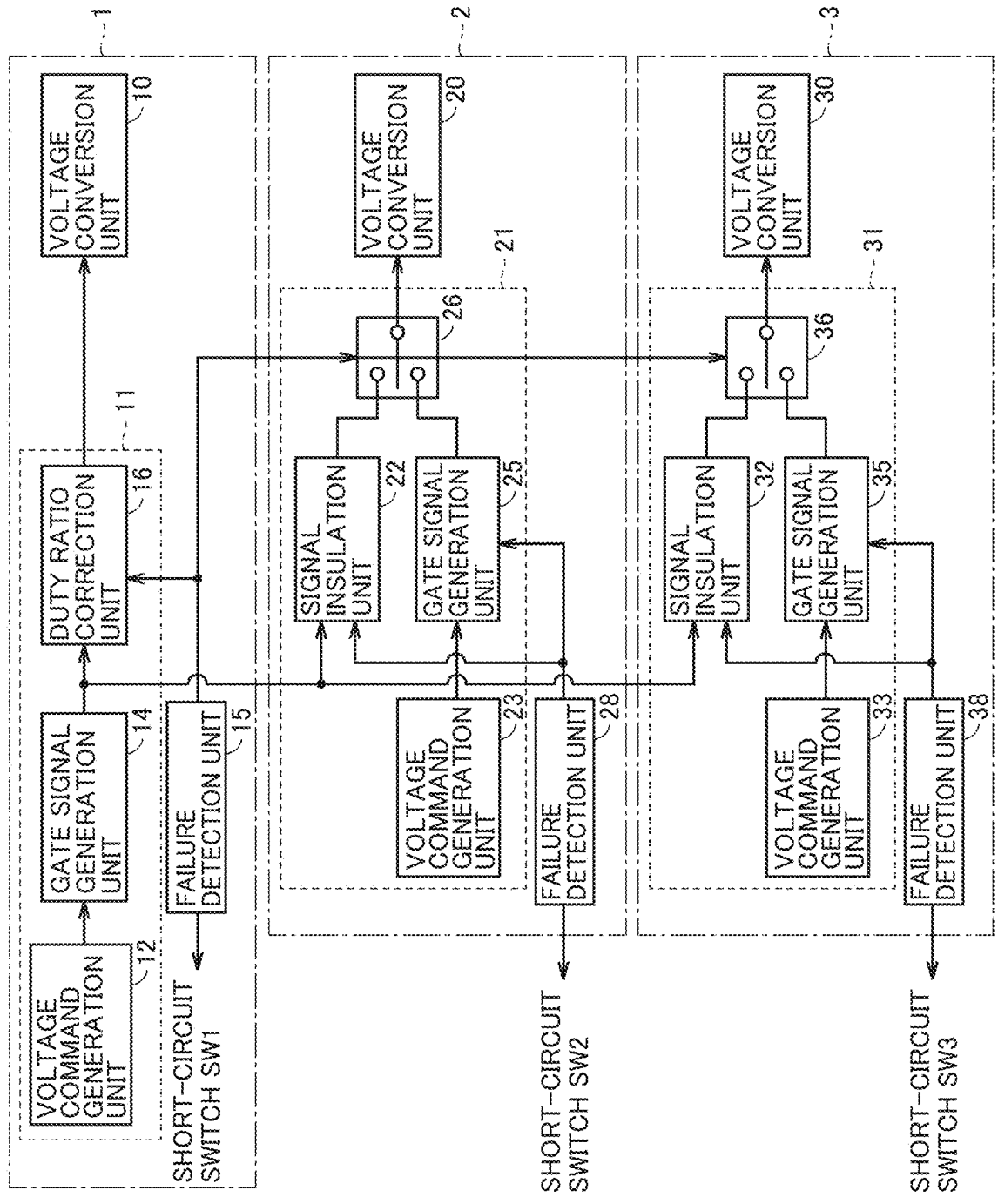
FIG. 21 is a block diagram for illustrating a configuration of a control unit in the self-power feed circuit according to the fifth embodiment.

Reference will now be made to FIG. 21 to describe a configuration of control units 11, 21 and 31. Each block shown in FIG. 21 has a function which can be implemented by at least one of software processing by the control unit and hardware processing.

Referring to FIG. 21, control unit 11 of master converter 1 is similar in configuration to control unit 11 shown in FIG. 18. In contrast, control unit 21 of slave converter 2 differs from control unit 21 shown in FIG. 18 in that the former does not include duty ratio correction unit 24. Control unit 31 of slave converter 3 differs from control unit 31 shown in FIG. 18 in that the former includes a single signal insulation unit 32 and a single switching unit 36.

In master converter 1, when failure detection unit 15 detects a failure of capacitor C1 or voltage conversion unit 10, failure detection unit 15 outputs a failure detection signal to duty ratio correction unit 16 and control unit 21 of slave converter 2. Furthermore, failure detection unit 15 switches on short-circuit switch SW1. When duty ratio correction unit 16 receives the failure detection signal from failure detection unit 15, duty ratio correction unit 16 provides a gate block signal to voltage conversion unit 10 to fix switching element Q1 to the OFF state.

In slave converter 2, voltage command generation unit 23 generates a voltage command, which indicates a target voltage for output voltage Vo of self-power feed circuit 100. Voltage command generation unit 23 is similar in configuration to voltage command generation unit 12 in control unit 11. The generated voltage command is provided to gate signal generation unit 25. Gate signal generation unit 25 generates a gate signal based on the voltage command generated by voltage command generation unit 23. Gate signal generation unit 25 is similar in configuration to gate signal generation unit 14 in control unit 11. Gate signal generation unit 25 inputs the generated gate signal to the first input terminal of switching unit 26. That is, slave converter 2 can per se generate a gate signal.

When signal insulation unit 22 receives a gate signal from gate signal generation unit 14 of control unit 11, signal insulation unit 22 inputs the gate signal to the second input terminal of switching unit 26. Switching unit 26 has an output terminal connected to voltage conversion unit 20. Switching unit 26 is configured to select either the gate signal input to the first input terminal or the gate signal input to the second input terminal, based on the failure detection signal provided from failure detection unit 15 of master converter 1.

Specifically, when capacitor C1 and voltage conversion unit 10 are normal, switching unit 26 selects the gate signal input to the second input terminal, that is, the gate signal transmitted from gate signal generation unit 14 via signal insulation unit 22. In contrast, when capacitor C1 or voltage conversion unit 10 fails, switching unit 26 selects the gate signal input to the first input terminal, that is, the gate signal generated by gate signal generation unit 25. Switching unit 26 outputs the selected gate signal to voltage conversion unit 20.

In slave converter 2, when failure detection unit 28 detects a failure of capacitor C2 or voltage conversion unit 20, failure detection unit 28 outputs a failure detection signal to signal insulation unit 22 and gate signal generation unit 25. Furthermore, failure detection unit 28 switches on short-circuit switch SW2. When signal insulation unit 22 and gate signal generation unit 25 receive the failure detection signal from failure detection unit 28, signal insulation unit 22 and gate signal generation unit 25 provide a gate block signal to voltage conversion unit 20 to fix switching element Q1 to the OFF state.

In slave converter 3, voltage command generation unit 33 generates a voltage command, which indicates the target voltage for output voltage Vo of self-power feed circuit 100. Voltage command generation unit 33 is similar in configuration to voltage command generation unit 12 in control unit 11. The generated voltage command is provided to gate signal generation unit 35. Gate signal generation unit 35 generates a gate signal based on the voltage command generated by voltage command generation unit 33. Gate signal generation unit 35 is similar in configuration to gate signal generation unit 14 in control unit 11. Gate signal generation unit 35 inputs the generated gate signal to the first input terminal of switching unit 36. That is, slave converter 3 can per se generate a gate signal.

When signal insulation unit 32 receives a gate signal from gate signal generation unit 14 of control unit 11, signal insulation unit 32 inputs the gate signal to the second input terminal of switching unit 36. Switching unit 36 has an output terminal connected to voltage conversion unit 30. Switching unit 36 is configured to select either the gate signal input to the first input terminal or the gate signal input to the second input terminal, based on the failure detection signal provided from failure detection unit 15 of master converter 1.

Specifically, when capacitor C1 and voltage conversion unit 10 are normal, switching unit 36 selects the gate signal input to the second input terminal, that is, the gate signal transmitted from gate signal generation unit 14 via signal insulation unit 32. In contrast, when capacitor C1 or voltage conversion unit 10 fails, switching unit 36 selects the gate signal input to the first input terminal, that is, the gate signal generated by gate signal generation unit 35. Switching unit 36 outputs the selected gate signal to voltage conversion unit 30.

In slave converter 3, when failure detection unit 38 detects a failure of capacitor C3 or voltage conversion unit 30, failure detection unit 38 outputs a failure detection signal to signal insulation unit 32 and gate signal generation unit 35. Furthermore, failure detection unit 38 switches on short-circuit switch SW3. When signal insulation unit 32 and gate signal generation unit 35 receive the failure detection signal from failure detection unit 38 signal insulation unit 32 and gate signal generation unit 35 provide a gate block signal to voltage conversion unit 30 to fix switching element Q1 to the OFF state.

Thus, self-power feed circuit 100 according to the fifth embodiment can continue to operate even when any of the plurality of capacitors fails or when any of the plurality of voltage conversion units fails.

Sixth Embodiment

In a sixth embodiment, an exemplary configuration of a power conversion device to which self-power feed circuit 100 according to the first to fifth embodiments is applicable will be described.

Figure 22:
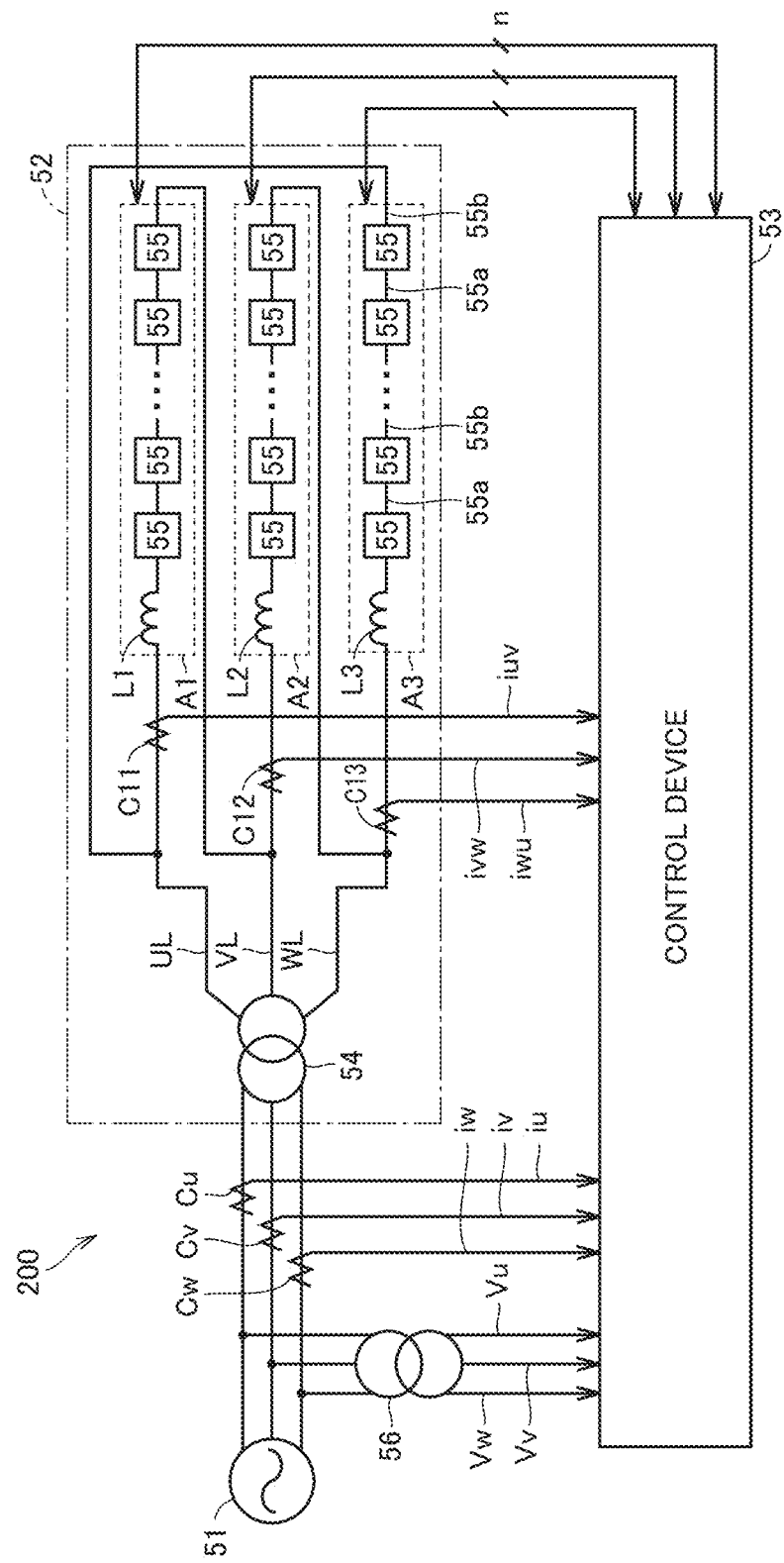
FIG. 22 is a schematic block diagram for illustrating an exemplary configuration of a power conversion device according to a sixth embodiment.

FIG. 22 is a schematic block diagram for illustrating an exemplary configuration of a power conversion device 200 according to the sixth embodiment. In FIG. 22, power conversion device 200 is used as a reactive power compensation device that compensates for reactive power of a power system 51. Power conversion device 200 according to the sixth embodiment can also be used as a direct-current power transmission system (High Voltage Direct Current (HVDC)) in addition to the reactive power compensation device.

Referring to FIG. 22, power conversion device 200 includes a modular multi-level converter (hereinafter referred to as MMC) 52, and a control device 53 to control MMC 52.

MMC 52 includes a transformer 54 and three-phase (U-, V-, and W-phase) alternating-current lines UL, VL, WL. Transformer 54 includes three primary windings and three secondary windings. The three primary windings are connected to three-phase power transmission lines, respectively, of a power system 1. The three secondary windings are connected to alternating-current lines UL, VL, WL at their respective one terminals, respectively.

MMC 52 is configured to inject or absorb reactive power to or from power system 51 via transformer 54. Specifically, when three-phase alternating-current voltage (hereinafter also referred to as "system voltage") of power system 1 is low, MMC 52 injects reactive power to power system 51 to increase the system voltage. In contrast, when the system voltage is high, MMC 52 absorbs reactive power from power system 51 to decrease the system voltage. MMC 52 can compensate for reactive power by injecting into or absorbing from power system 51 a current orthogonal to the system voltage.

Accordingly, when power conversion device 200 is in an ideal state, active power accommodated from power system 51 to MMC 52 is sufficiently smaller than reactive power. The ideal state includes a case where MMC 52 internally (or at a unit converter 55) has a power loss of substantially zero and a case where the system voltage is in a three-phase equilibrium state.

Although MMC 52 is connected to power system 51 via transformer 54 in FIG. 22, MMC 52 may be connected to power system 51 via a linkage reactor.

MMC 52 further includes arms A1 to A3. Arm A1 is connected between the other terminal of alternating-current line UL and the other terminal of alternating-current line VL. Arm A2 is connected between the other terminal of alternating-current line VL and the other terminal of alternating-current line WL. Arm A3 is connected between the other terminal of alternating-current line WL and the other terminal of alternating-current line UL. That is, arms A1 to A3 are connected by delta connection.

Each of arms A1 to A3 has a plurality of unit converters 55 (hereinafter also simply referred to as "cells") connected in series. The plurality of unit converters 55 each perform bidirectional power conversion in response to a control signal issued from control device 53. In the example of FIG. 22, n cells 55 are connected in series in each of arms A1 to A3, where n is an integer equal to or larger than 2. That is, MMC 52 has a total of 3n cells 55. Cell 55 corresponds to an embodiment of the "main circuit."

Arm A1 further includes a reactor L1 connected to the plurality of cells 55 in series. Arm A2 further includes a reactor L2 connected to the plurality of cells 55 in series. Arm A3 further includes a reactor L3 connected to the plurality of cells 55 in series. Each of reactors L1 to L3 is arranged to suppress a circulating current passing through the delta connection. Each of reactors L1 to L3 is positionally not limited as shown in FIG. 17 insofar as it is connected to the associated arm's cells 55 in series. Alternatively, a plurality of reactors L1, a plurality of reactors L2, and a plurality of reactors L3 may be distributed and thus arranged in the respectively associated arms A1, A2, and A3, respectively.

As shown in FIG. 22, arms A1 to A3 have cells 55 in their initial stages with their respective output terminals 55a connected via reactors L1 to L3 to alternating current lines UL, VL, WL at their respective other terminals, respectively. Arms A1 to A3 have cells 55 in their last stages with their respective output terminals 55b connected to alternating current lines VL, WL, UL at their respective other terminals, respectively. Each arm has other cells 55 than the initial and last stages with their output terminals 5a each connected to output terminal 55b of cell 55 of the immediately preceding stage, and their output terminals 55b each connected to output terminal 55a of cell 55 of the immediately following stage.

Current detectors Cu, Cv, and Cw for detecting currents iu, iv, and iw passing between power system 51 and MMC 52 are respectively disposed for the three-phase power transmission lines of power system 51. Further, a voltage detector 56 for detecting three-phase AC voltage Vu, Vv and Vw of power system 51 is disposed for the power transmission lines.

Further, a current detector C11 for detecting a current iuv passing through arm A1 is disposed for alternating-current line UL. A current detector C12 for detecting a current ivw passing through arm A2 is disposed for alternating-current line VL. A current detector C13 for detecting a current iwu passing through arm A3 is disposed for alternating-current line WL.

Current detectors Cu, Cv, Cw, and C11 to C13 and voltage detector 56 provide detection values which are in turn input to control device 53. Control device 53 follows a command received from a host controller (not shown) and uses the detection signal received from each detector to control an operation of each of arms A1 to A3 (that is, each of 3n cells 55).

Control device 53 can be composed for example of a microcomputer or the like. As an example, control device 53 can incorporate a memory and a CPU (not shown) and perform a control operation by the CPU executing a program previously stored in the memory. Alternatively, the control operation may partially or entirely be implemented by hardware processing using incorporated, dedicated electronic circuitry or the like instead of software processing.

Figure 23:
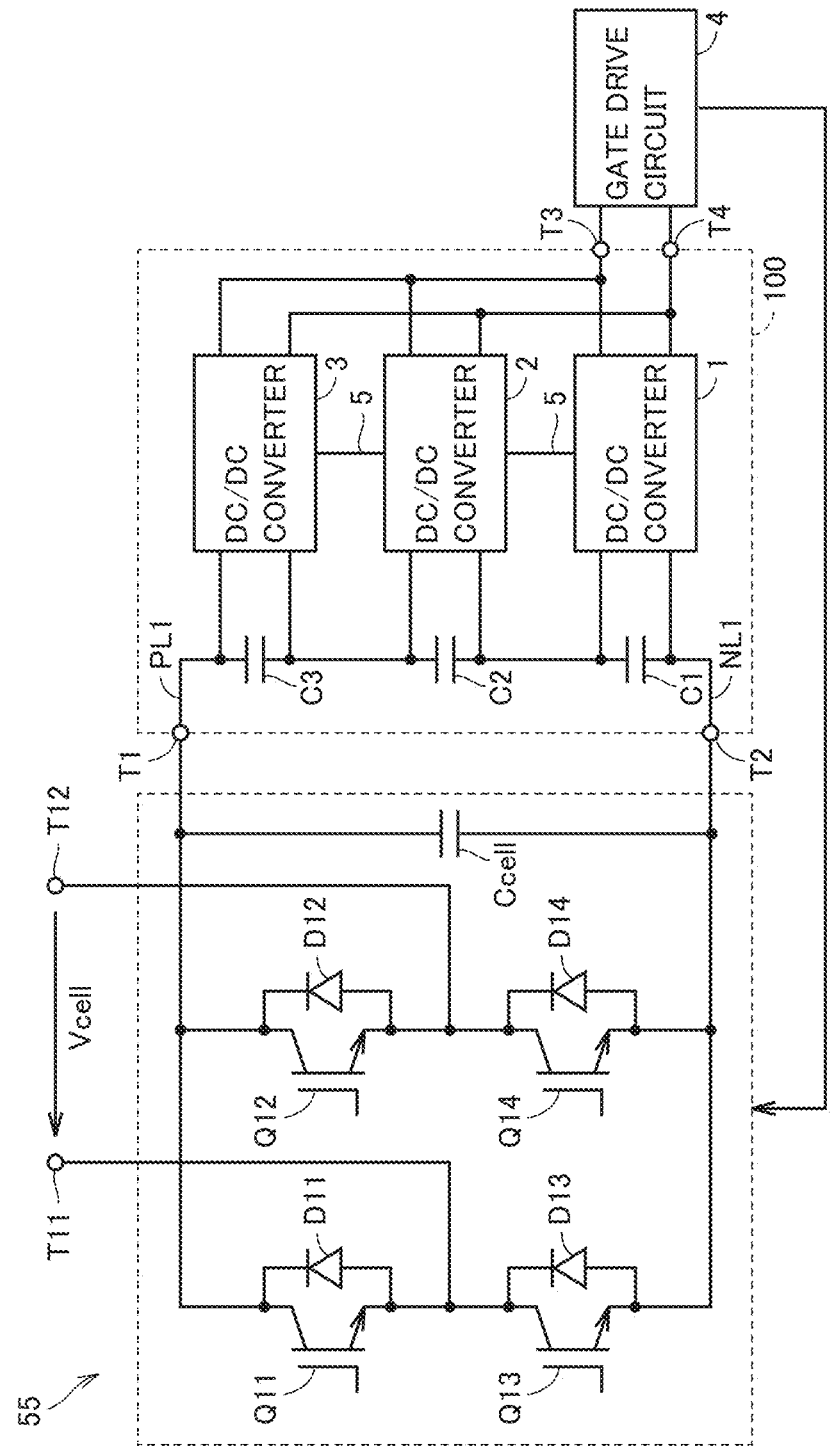
FIG. 23 is a circuit diagram showing an exemplary configuration of a cell shown in FIG. 22.

Hereinafter, an exemplary configuration of cell 55 shown in FIG. 22 will be described with reference to FIG. 23. Referring to FIG. 23, cell 55 has a so-called full-bridge configuration. Specifically, cell 55 includes output terminals T11 and T12, switching elements Q11 to Q14, diodes D11 to D14, a direct-current capacitor Ccell, self-power feed circuit 100, and gate drive circuit 4.

Switching elements Q11 to Q14 are each a self-arc-extinguishing power semiconductor element and composed of an IGBT for example. Switching elements Q11 and Q13 are connected in series between paired power lines (a positive electrode line PL1 and a negative electrode line NL1). Switching elements Q12 and Q14 are connected in series between the paired power lines. Switching elements Q11 and Q12 have their collectors both connected to positive electrode line PL1, and switching elements Q13 and Q14 have their emitters both connected to negative electrode line NL1. A connection point of the emitter of switching element Q11 and the collector of switching element Q13 is connected to output terminal T11. A connection point of the emitter of switching element Q12 and the collector of switching element Q14 is connected to output terminal T12. Diodes D11 to D14 are connected to switching elements Q11 to Q14, respectively, in antiparallel. Cell 55 can control voltage Vcell between output terminals T11 and T12 to be the voltage of direct-current capacitor Ccell or zero.

Self-power feed circuit 100 is connected between positive electrode line PL1 and negative electrode line NL1. Self-power feed circuit 100 includes a plurality of capacitors C1 to C3 connected in series between positive electrode line PL1 and negative electrode line NL1. Self-power feed circuit 100 allows self-power feed circuit 100 according to the first to fifth embodiments described above to be applied thereto.

Gate drive circuit 4 is connected to self-power feed circuit 100 and driven by power supplied from self-power feed circuit 100. In response to a gate signal from control device 53, gate drive circuit 4 controls switching elements Q11 to Q14 to be turned on/off (or switched). In accordance with the switching operation of switching elements Q11 to Q14, cell 55 can switch output voltage Vcell between output terminals T11 and T12 among direct-current voltages Vdc, 0 and −Vdc between positive electrode line PL1 and negative electrode line NL1.

Note that with respect to the first to sixth embodiments described above, including any combination that is not mentioned in the specification, a configuration described in each embodiment is intended to be combined with another, as appropriate, within a range without inconsistency or contradiction, in the subject application as originally filed.

It should be understood that the embodiments disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

1 DC/DC converter (master converter), 2, 3 DC/DC converter (slave converter), 4 gate drive circuit, 5 signal line, 10, 20, 30 voltage conversion unit, 11, 21, 31 control unit, 12, 23, 33 voltage command generation unit, 14, 25, 35 gate signal generation unit, 15, 28, 38 failure detection unit, 16, 24 duty ratio correction unit, 17, 27, 37 voltage detector, 18 transformer, 18a primary winding, 18b secondary winding, 22, 32 signal insulation unit, 26, 36 switching unit, 53 control device, 54 transformer, 55 unit converter (or cell), 100 self-power feed circuit, 200 power conversion device, C1-C3 capacitor, Ccell direct-current capacitor, D1, D11-D14, Don, Doff diode, DR, DR1, DR2 duty ratio, L1-L3 reactor, LD light emitting diode, NL1 negative electrode line, PC photocoupler, PL1 positive electrode line, Q, Q1, Q11-Q14 switching element, RL load resistor, Roff, Ron resistive element, SW1-SW3 short-circuit switch, T1, T2 input terminal, T3, T4, T11, T12 output terminal.

The invention claimed is:
1. A self-power feed circuit to feed power from a main circuit to a control device of the main circuit, comprising:
   first and second input terminals electrically connected to the main circuit;
   an output terminal electrically connected to the control device;

a plurality of power storage elements connected in series between the first and second input terminals;

a plurality of voltage converters each having an input connected to an associated one of the plurality of power storage elements, and an output connected to the output terminal in parallel;

signal insulation circuitry to transmit a signal in a state with the plurality of voltage converters electrically insulated from one another, the plurality of voltage converters including a master converter and a plurality of slave converters, the master converter converting a voltage of an associated power storage element, based on a duty ratio for matching an output voltage to a voltage command value, outputting the converted voltage to the output terminal, and transmitting a control signal indicative of the duty ratio to the plurality of slave converters via the signal insulation circuitry, the control signal output from the signal insulation circuitry having a cumulative falling time and a falling time that is larger than a rising delay time and a rising time, the plurality of slave converters each converting a voltage of an associated power storage element in response to the control signal transmitted via the signal insulation circuitry, and outputting the converted voltage to the output terminal; and correction circuitry to correct at least the duty ratio in the master converter such that the duty ratio in the master converter matches a duty ratio in each of the plurality of slave converters.

2. The self-power feed circuit according to claim 1, wherein
the master converter and the plurality of slave converters are tree-connected by the signal insulation circuitry with the master converter being of a highest level, and
the correction circuitry includes duty ratio correction circuitry provided to the master converter and each of the plurality of slave converters excluding a slave converter of a lowest level.

3. The self-power feed circuit according to claim 2, wherein the duty ratio correction circuitry corrects the duty ratio in the voltage converter to which the duty ratio correction circuitry is provided to match a duty ratio in the slave converter of the lowest level.

4. The self-power feed circuit according to claim 3, wherein the duty ratio correction circuitry includes any one of a photocoupler, a filter circuit, and software processing.

5. The self-power feed circuit according to claim 3, further comprising:
a plurality of short-circuit switches each provided between an associated one of the plurality of power storage elements and an associated one of the plurality of voltage converters to electrically short-circuit terminals of the associated power storage element in a conducting state; and
failure detection circuitry provided for an associated one of the plurality of power storage elements to cause a short-circuit switch connected to the associated power storage element to conduct when a failure of the associated power storage element is detected, wherein
when any one of at least one slave converter connected to the master converter receives a failure detection signal from the failure detection circuitry associated with the master converter, the one slave converter
generates the control signal,
converts a voltage of an associated power storage element in response to the generated control signal,
outputs the converted voltage to the output terminal, and
transmits the generated control signal to another slave converter via the signal insulation circuitry.

6. The self-power feed circuit according to claim 2, wherein the duty ratio correction circuitry includes any one of a photocoupler, a filter circuit, and software processing.

7. The self-power feed circuit according to claim 2, further comprising:
a plurality of short-circuit switches each provided between an associated one of the plurality of power storage elements and an associated one of the plurality of voltage converters to electrically short-circuit terminals of the associated power storage element in a conducting state; and
failure detection circuitry provided for an associated one of the plurality of power storage elements to cause a short-circuit switch connected to the associated power storage element to conduct when a failure of the associated power storage element is detected, wherein
when any one of at least one slave converter connected to the master converter receives a failure detection signal from the failure detection circuitry associated with the master converter, the one slave converter
generates the control signal,
converts a voltage of an associated power storage element in response to the generated control signal,
outputs the converted voltage to the output terminal, and
transmits the generated control signal to another slave converter via the signal insulation circuitry.

8. The self-power feed circuit according to claim 1, wherein
the master converter and the plurality of slave converters are star-connected by the signal insulation circuitry, and
the correction circuitry includes a duty ratio correction circuitry provided in the master converter.

9. The self-power feed circuit according to claim 8, wherein the duty ratio correction circuitry corrects the duty ratio in the master converter to match the duty ratio in each of the plurality of slave converters.

10. The self-power feed circuit according to claim 9, wherein the duty ratio correction circuitry includes any one of a photocoupler, a filter circuit, and software processing.

11. The self-power feed circuit according to claim 9, further comprising:
a plurality of short-circuit switches each provided between an associated one of the plurality of power storage elements and an associated one of the plurality of voltage converters to electrically short-circuit terminals of the associated power storage element in a conducting state; and
failure detection circuitry provided for an associated one of the plurality of power storage elements to cause a short-circuit switch connected to the associated power storage element to conduct when a failure of the associated power storage element is detected, wherein
when any one of the plurality of slave converters receives a failure detection signal from the failure detection circuitry associated with the master converter, the one slave converter
generates the control signal,
converts a voltage of an associated power storage element in response to the generated control signal,
outputs the converted voltage to the output terminal, and transmits the generated control signal to another slave converter via the signal insulation circuitry.

12. The self-power feed circuit according to claim 9, further comprising:
   a plurality of short-circuit switches each provided between an associated one of the plurality of power storage elements and an associated one of the plurality of voltage converters to electrically short-circuit terminals of the associated power storage element in a conducting state; and
   failure detection circuitry provided to an associated one of the plurality of power storage elements to cause a short-circuit switch connected to the associated power storage element to conduct when a failure of the associated power storage element is detected, wherein
   when the plurality of slave converters receive a failure detection signal from the failure detection circuitry associated with the master converter, the plurality of slave converters each
   generate the control signal,
   convert a voltage of an associated power storage element in response to the generated control signal, and
   output the converted voltage to the output terminal.

13. The self-power feed circuit according to claim 8, further comprising:
   a plurality of short-circuit switches each provided between an associated one of the plurality of power storage elements and an associated one of the plurality of voltage converters to electrically short-circuit terminals of the associated power storage element in a conducting state; and
   failure detection circuitry provided for an associated one of the plurality of power storage elements to cause a short-circuit switch connected to the associated power storage element to conduct when a failure of the associated power storage element is detected, wherein
   when any one of the plurality of slave converters receives a failure detection signal from the failure detection circuitry associated with the master converter, the one slave converter
   generates the control signal,
   converts a voltage of an associated power storage element in response to the generated control signal,
   outputs the converted voltage to the output terminal, and
   transmits the generated control signal to another slave converter via the signal insulation circuitry.

14. The self-power feed circuit according to claim 8, further comprising:
   a plurality of short-circuit switches each provided between an associated one of the plurality of power storage elements and an associated one of the plurality of voltage converters to electrically short-circuit terminals of the associated power storage element in a conducting state; and
   failure detection circuitry provided to an associated one of the plurality of power storage elements to cause a short-circuit switch connected to the associated power storage element to conduct when a failure of the associated power storage element is detected, wherein
   when the plurality of slave converters receive a failure detection signal from the failure detection circuitry associated with the master converter, the plurality of slave converters each
   generate the control signal,
   convert a voltage of an associated power storage element in response to the generated control signal, and
   output the converted voltage to the output terminal.

15. The self-power feed circuit according to claim 8, wherein the duty ratio correction circuitry includes any one of a photocoupler, a filter circuit, and software processing.

16. The self-power feed circuit according to claim 1, further comprising:
   a plurality of short-circuit switches each provided between an associated one of the plurality of power storage elements and an associated one of the plurality of voltage converters to electrically short-circuit terminals of the associated power storage element in a conducting state; and
   failure detection circuitry provided for an associated one of the plurality of power storage elements to cause a short-circuit switch connected to the associated power storage element to conduct when a failure of the associated power storage element is detected.

17. A power conversion device comprising:
   a main circuit having a switching element to perform alternating current/direct current power conversion by turning on/off the switching element;
   a control device to control the switching element in the main circuit to be turned on/off; and
   the self-power feed circuit according to claim 1, to supply power from the main circuit to the control device.

* * * * *